United States Patent
Yamaguchi

(10) Patent No.: US 11,817,907 B2
(45) Date of Patent: Nov. 14, 2023

(54) OPTICAL TRANSMISSION DEVICE AND OPTICAL TRANSMISSION METHOD

(71) Applicant: NEC Corporation, Tokyo (JP)

(72) Inventor: Shohei Yamaguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 107 days.

(21) Appl. No.: 17/299,447

(22) PCT Filed: Dec. 19, 2019

(86) PCT No.: PCT/JP2019/049876
§ 371 (c)(1),
(2) Date: Jun. 3, 2021

(87) PCT Pub. No.: WO2020/137821
PCT Pub. Date: Jul. 2, 2020

(65) Prior Publication Data
US 2022/0060261 A1    Feb. 24, 2022

(30) Foreign Application Priority Data
Dec. 26, 2018 (JP) .................... 2018-242890

(51) Int. Cl.
*H04B 10/07* (2013.01)
*H04B 10/572* (2013.01)
(Continued)

(52) U.S. Cl.
CPC ......... *H04B 10/572* (2013.01); *H04B 10/077* (2013.01); *H04J 14/0212* (2013.01)

(58) Field of Classification Search
CPC ..................................................... H04B 10/07
See application file for complete search history.

(56) References Cited

U.S. PATENT DOCUMENTS 5,784,192 A    7/1998  Sugiyama et al.
6,331,908 B1*  12/2001  Adams ............... H04B 10/2537
                                              398/9
(Continued)

FOREIGN PATENT DOCUMENTS

JP    H03117941 A    5/1991
JP    H08265258 A    10/1996
(Continued)

OTHER PUBLICATIONS

International Search Report of PCT Application No. PCT/JP2019/049876 dated Feb. 25, 2020.
(Continued)

*Primary Examiner* — Shi K Li
(74) *Attorney, Agent, or Firm* — Sughrue Mion, PLLC

(57) ABSTRACT

To generate, in an optical transmission device, a response signal corresponding to executed control even when said optical transmission device does not comprise one or both of a main signal photoelectric conversion function and a main signal optical amplification function, an optical transmission device comprises: an extraction unit that outputs, from a first optical signal including a main signal and a control signal, a signal including control information included in the control signal; a control unit that executes control on the basis of the control information; and a response signal output unit that outputs, according to the control, a response signal in a wavelength band different from the main signal.

15 Claims, 19 Drawing Sheets

(51) Int. Cl.
*H04B 10/077* (2013.01)
*H04J 14/02* (2006.01)

(56) References Cited

U.S. PATENT DOCUMENTS

| | | | | |
|---|---|---|---|---|
| 6,909,853 | B1* | 6/2005 | Yamashita | H04B 10/077 398/31 |
| 2003/0011855 | A1* | 1/2003 | Fujiwara | H04B 10/0777 398/177 |
| 2003/0179988 | A1 | 9/2003 | Kai et al. | |
| 2005/0089334 | A1* | 4/2005 | Regev | H04B 10/672 398/139 |
| 2007/0189663 | A1 | 8/2007 | Hirai et al. | |
| 2008/0050115 | A1 | 2/2008 | Ikai et al. | |
| 2010/0134875 | A1* | 6/2010 | Mori | H04B 10/2935 359/334 |
| 2013/0071104 | A1* | 3/2013 | Nakashima | H04J 14/0204 398/3 |
| 2015/0318926 | A1* | 11/2015 | Zhang | H04B 10/0779 398/183 |
| 2015/0365191 | A1* | 12/2015 | Lee | H04J 14/0282 398/67 |
| 2017/0279665 | A1* | 9/2017 | Mukai | H04Q 11/0067 |
| 2019/0044621 | A1 | 2/2019 | Takigawa | |
| 2019/0305870 | A1 | 10/2019 | Aida | |
| 2020/0084209 | A1* | 3/2020 | Kram | H04B 10/27 |

FOREIGN PATENT DOCUMENTS

| | | |
|---|---|---|
| JP | 2000-278248 A | 10/2000 |
| JP | 2001016169 A | 1/2001 |
| JP | 2003032192 A | 1/2003 |
| WO | 2017141855 A1 | 8/2017 |
| WO | 2018079445 A1 | 5/2018 |

OTHER PUBLICATIONS

English translation of Written opinion for PCT Application No. PCT/JP2019/049876 dated Feb. 25, 2020.
Extended European Search Report for EP Application No. 19905314.1 dated Feb. 1, 2022.
JP Office Action for JP Application No. 2020-563175, dated Nov. 29, 2022 with English Translation.

* cited by examiner

OPTICAL TRANSMISSION DEVICE AND OPTICAL TRANSMISSION METHOD

This application is a National Stage Entry of PCT/JP2019/049876 filed on Dec. 19, 2019, which claims priority from Japanese Patent Application 2018-242890 filed on Dec. 26, 2018, the contents of all of which are incorporated herein by reference, in their entirety.

TECHNICAL FIELD

The present invention relates to an optical transmission device and an optical transmission method, and more particularly to an optical transmission device installed on the seabed and an optical transmission method to be used in the optical transmission device.

BACKGROUND ART

There has been known a submarine optical communication system in which a control signal is transmitted from a land station to a submarine optical transmission device and the submarine optical transmission device executes internal control according to the control signal. In such a system, it is desirable to confirm, at any one of land stations, whether the submarine optical transmission device executes control. PTLs 1 and 2 describe a technique of transmitting a signal, which is generated at a submarine optical transmission device, to a land station.

PTL 1 describes an optical submarine repeater that converts a received optical signal to an electric signal, identifies and reproduces the signal, converts the reproduced signal to an optical signal, and relays the signal. The optical submarine repeater superposes a monitoring signal by modulating the electric signal (transmission data) that is photo-electrically converted. Further, PTL 2 describes an optical amplification repeater that generates a response signal by modulating excitation light of an optical amplifier.

CITATION LIST

Patent Literature

[PTL 1] Japanese Unexamined Patent Application Publication No. H03-117941
[PTL 2] Japanese Unexamined Patent Application Publication No. H08-265258

SUMMARY OF INVENTION

Technical Problem

A submarine branching device has been known as one mode of the submarine optical transmission device. The submarine branching device switches a path of power supply current or an optical signal according to a control signal from a land station. Further, in a submarine optical communication system using the submarine branching device, it is also preferred that, at the land station, whether control for switching the path according to the control signal from the land station is executed be confirmed. Thus, it is desired that the submarine branching device have a function of generating a response signal according to control.

However, unlike the devices described in PTLs 1 and 2, a general submarine branching device does not necessarily have a photo-electric conversion function of converting a main signal to an electric signal or an optical amplification function of amplifying the main signal. Therefore, the technique described in PTL 1 or 2 is not applicable when a general submarine branching device is caused to have a function of generating a response signal. Further, besides the submarine branching device, the technique in PTL 1 or 2 is not applicable to an optical transmission device that does not have a main signal photo-electric conversion function or a main signal optical amplification function.

OBJECT OF INVENTION

The present invention provides a technique in which an optical transmission device generates a response signal according to executed control even when the optical transmission device does not have one or both of a main signal photo-electric conversion function and a main signal optical amplification function.

Solution to Problem

An optical transmission device according to the present invention includes an extraction means for outputting a signal from a first optical signal including a main signal and a control signal, the signal including control information included in the control signal, a control means for executing control, based on the control information, and a response signal output means for outputting a response signal in a wavelength band different from a wavelength band of the main signal, according to the control.

An optical transmission method according to the present invention includes outputting a signal from a first optical signal including a main signal and a control signal, the signal including control information included in the control signal, executing control, based on the control information, and outputting a response signal in a wavelength band different from a wavelength band of the main signal, according to the control.

Advantageous Effects of Invention

The present invention enables an optical transmission device to have a function of generating a response signal according to executed control even when the optical transmission device does not have one or both of a main signal photo-electric conversion function and a main signal optical amplification function.

EXAMPLE EMBODIMENT

First Example Embodiment

Figure 1:
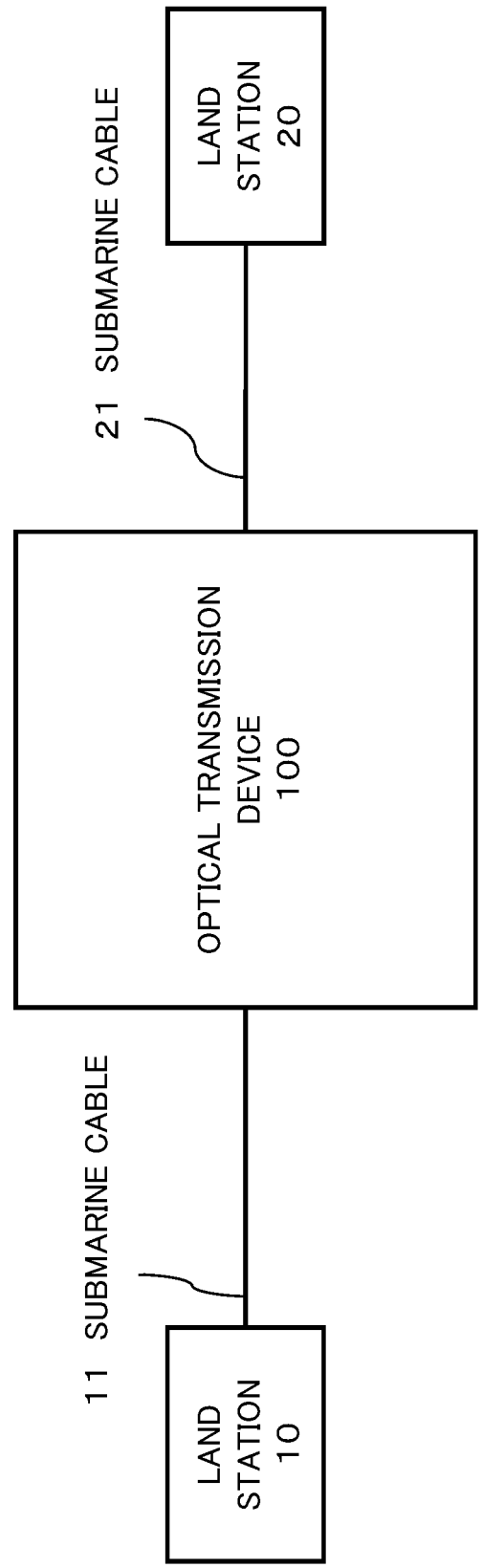
FIG. 1 is a block diagram illustrating a configuration example of an optical transmission system 1.

FIG. 1 is a block diagram illustrating a configuration example of an optical transmission system 1 of a first example embodiment of the present invention. The optical transmission system 1 includes an optical transmission device 100, a land station 10, and a land station 20. The optical transmission device 100 is installed on the seabed. The optical transmission device 100 is connected to the land station 10 via a submarine cable 11, and is connected to the land station 20 via a submarine cable 21. The land stations 10 and 20 are terminal stations in the optical transmission system 1, and are installed on land. Another optical transmission device may be arranged halfway on the submarine cables 11 and 21. Further, the number of land stations connected to the optical transmission device 100 via the submarine cables is not limited to two. The optical transmission device 100 may transmit and receive an optical signal with three or more land stations, using three or more submarine cables.

An optical signal (main signal) including user data is transmitted between the land station 10 and the land station 20. The land stations 10 and 20 each include at least one of an optical transmitter and an optical receiver that are required for transmitting the user data via the optical transmission device 100. The submarine cables 11 and 21 each include an optical transmission path and a power supply path. An optical signal transmitted in the optical transmission system 1 is transmitted via the optical transmission paths included in the submarine cables 11 and 21. In general, the optical transmission path is an optical fiber. The land stations 10 and 20 each include a power supply device, and supply power to the optical transmission device 100 via the power supply path.

Figure 2:
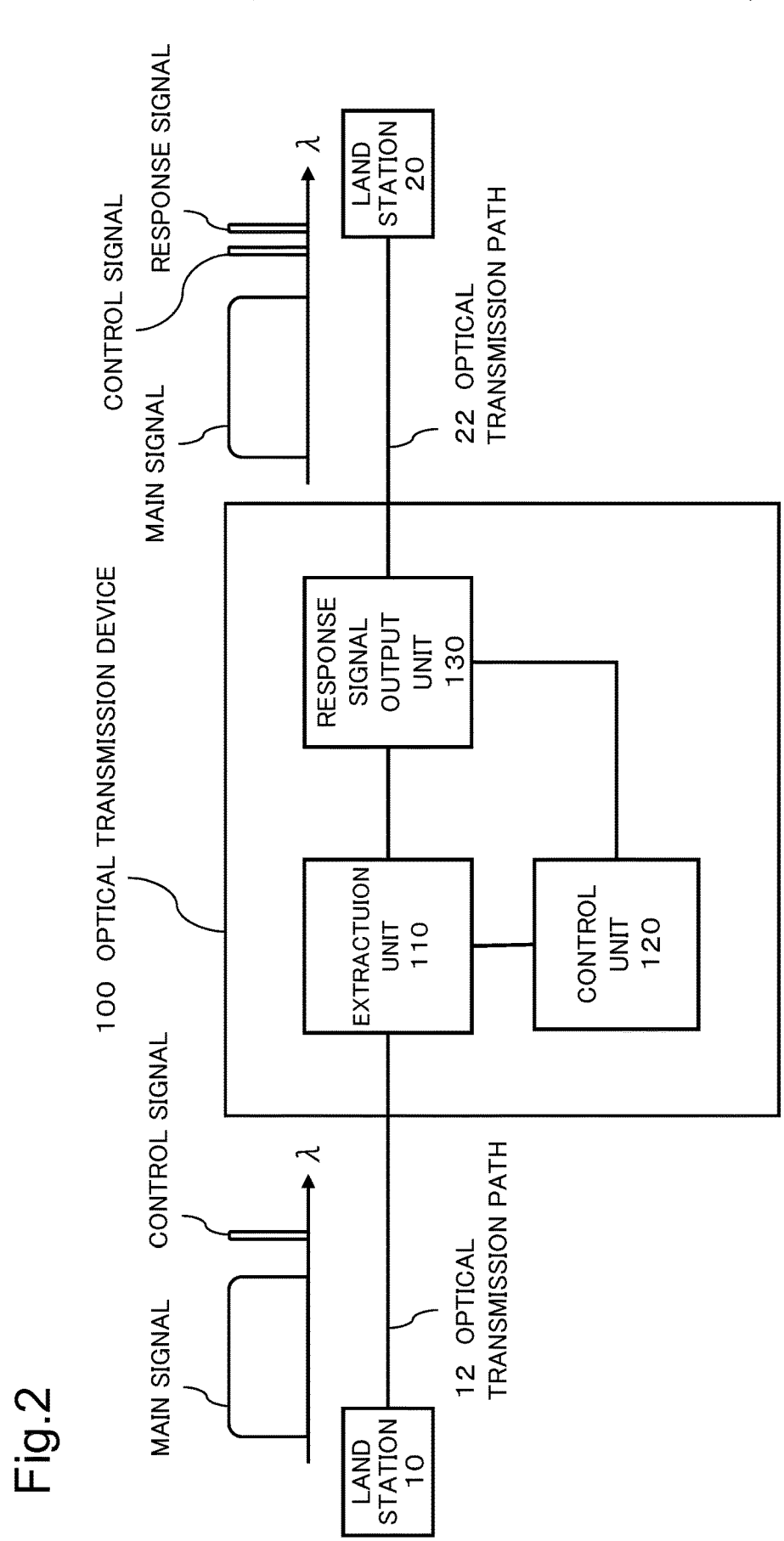
FIG. 2 is a block diagram illustrating a configuration example of an optical transmission device 100.

FIG. 2 is a block diagram illustrating a configuration example of the optical transmission device 100 in the optical transmission system 1. The optical transmission device 100 includes an extraction unit 110, a control unit 120, and a response signal output unit 130. The optical transmission device 100 inputs and outputs an optical signal via optical transmission paths 12 and 22. The optical transmission paths 12 and 22 are included in the submarine cables 11 and 21 of FIG. 1. Power is supplied from the land station to the optical transmission device 100 via the power supply paths included in the submarine cables 11 and 21. Note that, in the following drawings and description, constituent elements that are already described are denoted with the same reference symbols, and redundant description is omitted. Further, in the following drawings, the power supply path is illustrated only when required.

An optical signal including a main signal and a control signal is input to the extraction unit 110 via the optical transmission path 12. The main signal is a high-speed optical signal including the user data. For example, the main signal is a wavelength division multiplexed (WDM) signal acquired by modulating each of a plurality of carriers with data at a speed of 1 gigabit per second (Gbps) or more. The control signal is an optical signal including control information for controlling a device used in the optical transmission system 1. The main signal includes the user data, and hence has a wavelength band width wider than a wavelength band width of the control signal. Note that the "wavelength band" indicates a wavelength region occupied by the optical signal. FIG. 2 schematically illustrates an arrangement example of wavelength bands of the main signal, the control signal, and a response signal in the optical transmission paths 12 and 22 with a vertical axis as power of the optical signal and a horizontal axis as a wavelength ($\lambda$). The wavelength bands of the main signal, the control signal, and the response signal do not overlap with one another.

In the optical transmission device 100, the extraction unit 110 functions as an extraction means for extracting a signal including control information from an input optical signal and outputting the signal to the control unit 120. The control unit 120 functions as a control means for executing control, based on control information. The response signal output unit 130 functions as a response signal output means for generating a response signal according to control executed by the control unit 120 and outputting the response signal to the optical transmission path 22. Configuration examples of the extraction unit 110 and the response signal output unit 130 are described later.

The optical transmission device 100 thus configured generates the response signal, which is arranged in a wavelength band different from a wavelength band of the main signal, according to the control executed by the control unit 120. Further, the generated response signal is output to the optical transmission path 22. Specifically, even when the optical transmission device 100 does not have one or both of a main signal photo-electric conversion function and a main signal optical amplification function, the optical transmission device 100 can output the response signal according to the control to the optical transmission path 22. As a result, based on the response signal, the land station 20 that receives the response signal can confirm that the control based on the control signal is executed in the optical transmission device 100.

Second Example Embodiment

In the following example embodiments, specific configurations or modification examples of the optical transmission device 100 of the first example embodiment are described.

Figure 3:
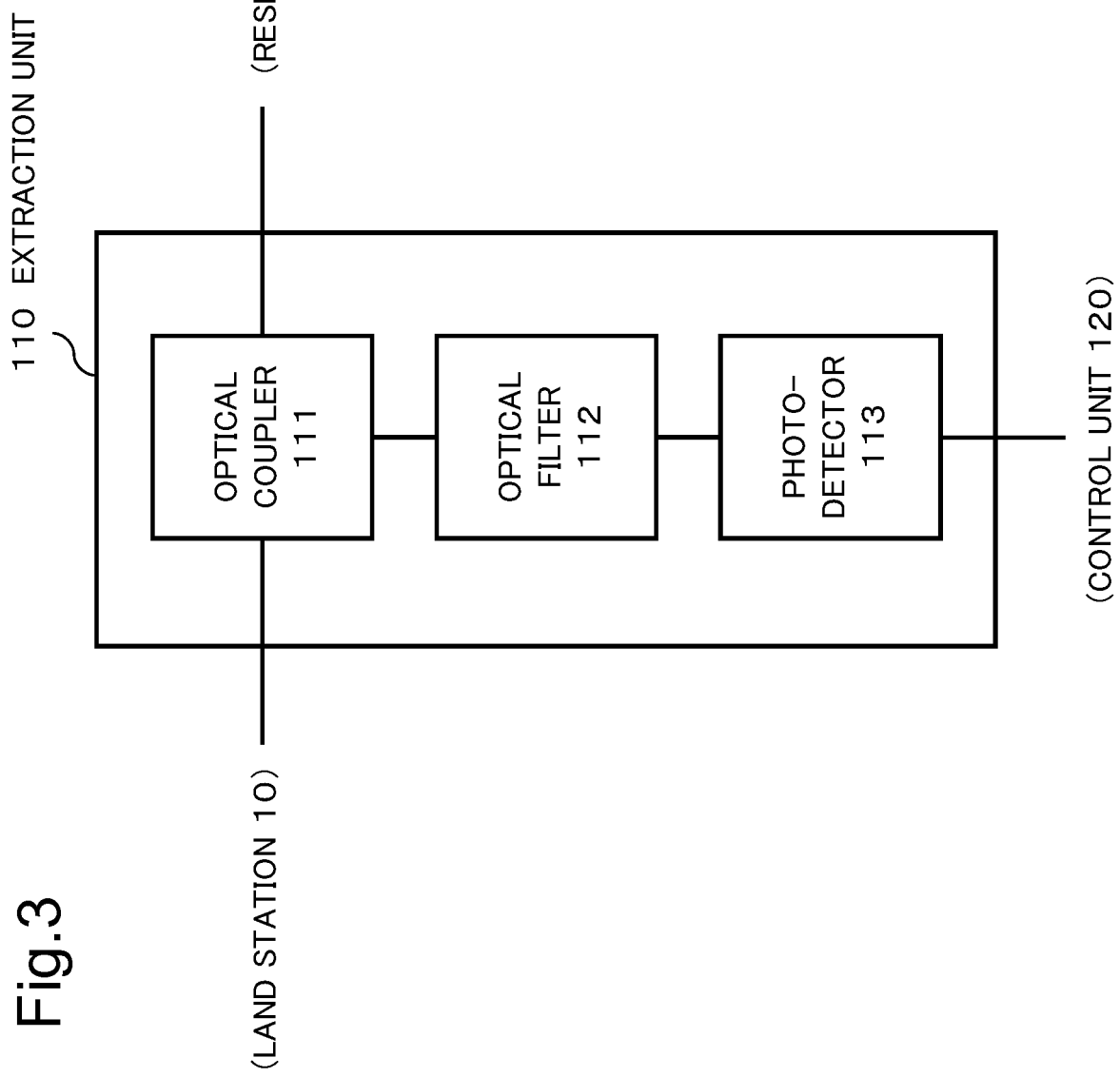
FIG. 3 is a block diagram illustrating a configuration example of an extraction unit 110.

FIG. 3 is a block diagram illustrating a configuration example of the extraction unit 110. The extraction unit 110 includes an optical coupler 111, an optical filter 112, and a photodetector 113. For example, the optical coupler 111 is a 1×2 optical directional coupler using an optical fiber or an optical waveguide.

An optical signal that is input from the land station 10 to the optical transmission device 100 via the optical transmission path 12 includes a main signal and a control signal. The control signal includes control information. The optical coupler 111 splits the input optical signal into two parts. One part of the optical signal that are split into two is output to the response signal output unit 130, and the other part is output to the optical filter 112.

The optical filter 112 is an optical filter that selectively allows light in the wavelength band of the control signal to pass therethrough. Specifically, the optical filter 112 blocks light in the wavelength band of the main signal, and allows light in the wavelength band of the control signal to pass therethrough. For example, the optical filter 112 is an optical band pass filter that only allows light in the wavelength band of the control signal to pass therethrough. The control signal passing through the optical filter 112 is input to the photodetector 113. For example, the photodetector 113 is a photo diode (PD), and converts the input control signal to an electric signal and outputs the signal to the control unit 120. The electric signal that is output to the control unit 120 includes the control information.

The control information may be transmitted as a low frequency signal superposed to an amplitude of the main signal, instead of the optical signal (the control signal). A frequency of the superposed signal including the control information is preferably a low frequency (for example, 100 kHz or lower) that does not affect quality of the main signal. In this case, the optical filter 112 can be omitted. Further, a band pass filter or a low pass filter, which only allows the electric signal in the frequency band of the superposed signal to pass therethrough, is provided to an output of the photodetector 113. When the electric signal output from the photodetector 113 passes through the band pass filter, the electric signal including the control information from which an impact of the high-speed main signal is removed is extracted.

The control information included in the electric signal output from the photodetector 113 includes an address indicating a function block being a control target and a control command for the function block indicated with the address. The function block is hardware of the optical transmission device 100 the control target of which is specified with the address or a function of the hardware, and is a split unit for the optical signal or a split function of the optical transmission device 100, for example. A specific example of the function block is described in the following example embodiments. Further, in the block diagram of the optical transmission device in each example embodiment, the function block is illustrated only when required for description.

When the function block indicated with the address is included in the optical transmission device 100, the control unit 120 controls the optical transmission device 100, based on the control command. The control unit 120 extracts the address and the control command from the control information, and executes the control command with respect to the function block indicated with the address. The control unit 120 transmits the control command to the function block indicated with the address, and the function block may interpret the control command and may execute control based on the result. Alternatively, the control unit 120 may interpret the control command, and the control unit 120 may output, to the function block, the electric signal in a format that can be directly executed by the function block.

Figure 4:
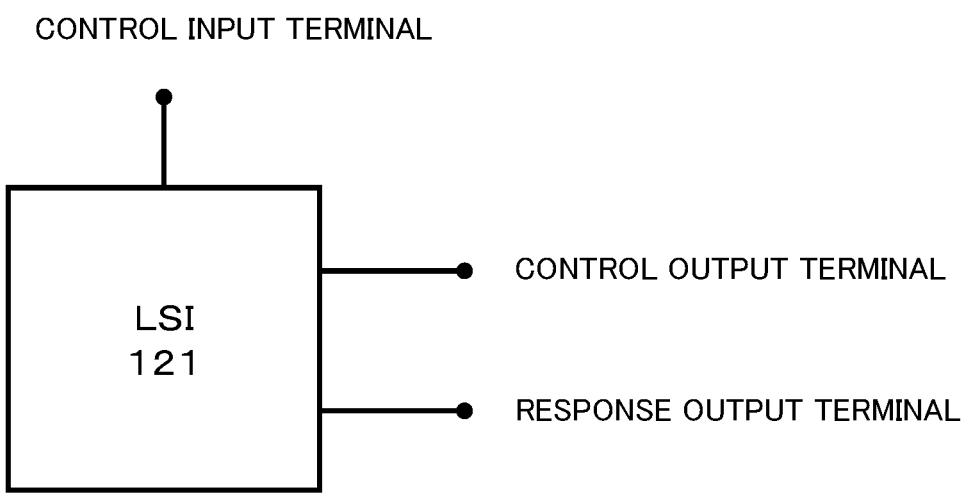
FIG. 4 is a diagram describing an example of terminals of an LSI 121.

An example in which the control unit 120 is configured as a large-scale integration (LSI) 121 is described. FIG. 4 is a diagram describing an example of terminals of the LSI 121 as the control unit 120. The LSI 121 includes a control input terminal, a control output terminal, and a response output terminal. The electric signal including the control information is input from the photodetector 113 to the control input terminal. The LSI 121 analyzes the electric signal, and extracts the control information. The control output terminal is connected to function blocks. When the address included in the control information indicates any one of the function blocks connected to the LSI 121, the LSI 121 changes a voltage of an output signal of the control output terminal according to the control command, and thus executes control for the function block. The output signal of the control output terminal has an addressing function of selecting a function block being a control target and a control function of controlling the function block subjected to addressing. With this, the LSI 121 is capable of controlling only the function block designated by the address.

The response output terminal is connected to the response signal output unit 130. The LSI 121 changes a voltage of the output signal of the control output terminal, and then outputs a signal for instructing generation of the response signal to the response output terminal. When the LSI 121 cannot output the control command to the control output terminal due to some sort of an error, the LSI 121 does not output the signal for instructing generation of the response signal.

The control output terminal may have a function of receiving a signal from the function block. In this case, after receiving a signal indicating control completion from the function block, the LSI 121 may output the signal for instructing generation of the response signal. Further, when the LSI 121 does not receive the signal indicating control completion from the function block during a predetermined period, the signal for instructing generation of the response signal may not be output to the response signal output unit 130. Only in a case where control is completed in the function block, when the LSI 121 outputs the signal for instructing generation of the response signal to the response signal output unit 130 according to the signal indicating control completion, the response signal output unit 130 outputs the response signal.

The response signal output unit 130 generates the response signal according to the signal for instructing generation of the response signal from the control unit 120. An instruction for generating the response signal is performed by outputting response information as a signal from the response output terminal of the LSI 121 to the response signal output unit 130. When the response information is not received from the LSI 121, the response signal output unit 130 does not generate the response signal according to control execution.

Figure 5:
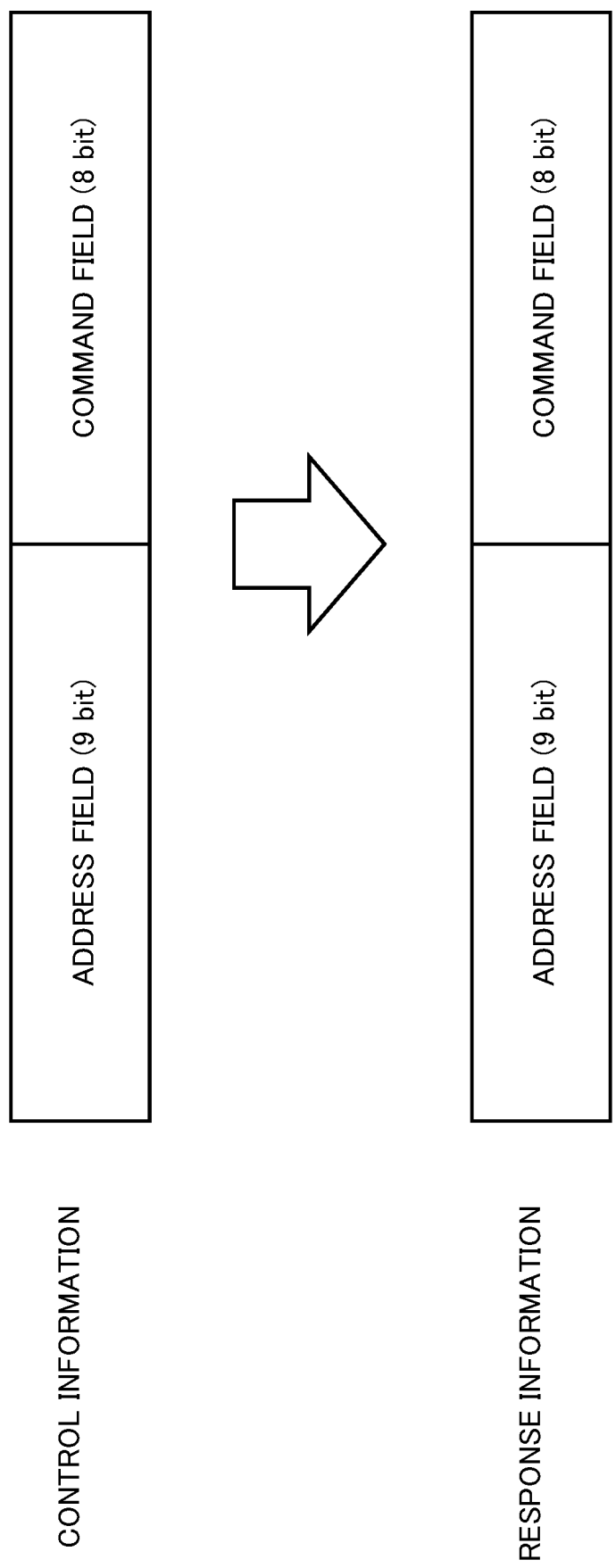
FIG. 5 is a diagram illustrating an example of fields of control information and response information.

An example of the control information and the response information is described below. FIG. 5 is a diagram illustrating an example of fields of the control information and the response information. The land station 10 generates control information including the address of the function block being a control target and the control command, and transmits the control signal including the control information. As indicated in the upper part of FIG. 5, the control information includes an address field and a command field. The address field of the control information stores the address of the function block being a control target. The command field of the control information stores the control command executed with respect to the function block indicated in the address field. A configuration and the number of bits of each field are freely selectable, and are not limited to the example in FIG. 5.

When a plurality of function blocks are provided, an address that is different for each of the function blocks is allocated in advance. The control unit 120 may include a storage unit that stores a table in which association between the addresses and the function blocks being control targets are recorded. The land station 10 may notify the optical transmission device 100 of the table as the control information in which the control unit 120 is set as a control target. A transmission means used in such a notification is freely selectable. The table may be written in the storage unit of the control unit 120 at the time of manufacturing the optical transmission device 100. Further, the land station 10 may add or update the table by designating the address of the control unit 120 as the control information and notifying the control unit 120 of the table.

When the address stored in the address field matches with any one of the addresses stored in the table, the control unit 120 executes the control command with respect to the function block indicated with the address. After executing the control command or receiving the notification of control completion from the function block, the control unit 120 outputs the response information, and thus instructs the response signal output unit 130 to generate the response signal.

The control information includes the address associated with the function block being a control target and the control command, and thus the control information can be directly used as the response information as illustrated in FIG. 5. In this case, the LSI 121 outputs the control information as the response information, and the response signal output unit 130 outputs the optical signal modulated with the response information, as the response signal. After executing control, the response information is output from the control unit 120 to the response signal output unit 130. The response signal output unit 130 generates the response signal including the response information (for example, the optical signal modulated according to the response information), and outputs the optical signal including the response signal and the main signal to the land station 20. Therefore, the land station 20 that receives the response signal can determine that the control command is executed with respect to the function block indicated with the address in the response information included in the response signal. The control information can be formed of data containing a relatively short text, and hence the control signal and the response signal can be transmitted in a relatively narrower band as compared to the main signal.

Figure 6:
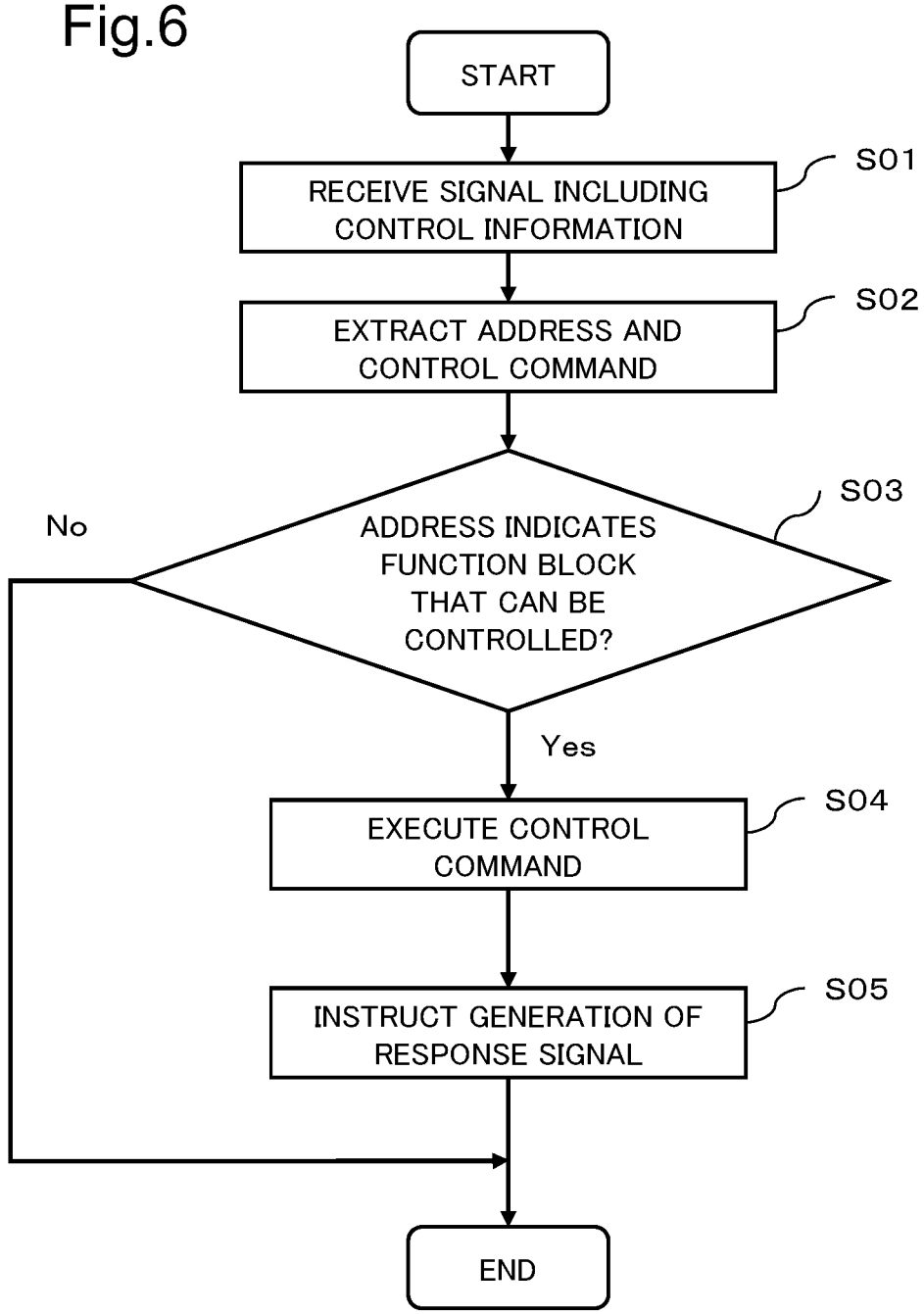
FIG. 6 is a flowchart illustrating an example of an operation procedure of a control unit 120.

FIG. 6 is a flowchart illustrating an example of an operation procedure of the control unit 120. The control unit 120 (for example, the LSI 121) receives the signal including the control information from the extraction unit 110 (Step S01 in FIG. 6). This signal is an electric signal converted from the control signal. The control unit 120 extracts, from the control information included in the signal, the address and the control command associated with the address (Step S02). The control unit 120 refers to the table describing the association between the addresses and the control commands, and examines whether the extracted address indicates the function block of the control unit 120, which is a control target (Step S03). When the address does not indicate such a function block (No in Step S03), the processing is terminated. In this case, the response signal based on the control command associated with the address is not generated.

When the address indicates a function block that can be controlled (Yes in Step S03), the control unit 120 executes the control command with respect to the function block indicated with the address (Step S04). After executing the control command, the control unit 120 instructs the response signal output unit 130 to generate the response signal (Step S05).

As described above, in the optical transmission device 100 and the optical transmission system 1 including the optical transmission device 100, the response signal output unit 130 generates the response signal according to control of the control unit 120. As a result, even when the optical transmission device 100 does not have one or both of a main signal photo-electric conversion function and a main signal optical amplification function, the optical transmission device 100 can generate the response signal according to control of the control unit 120.

Figure 7:
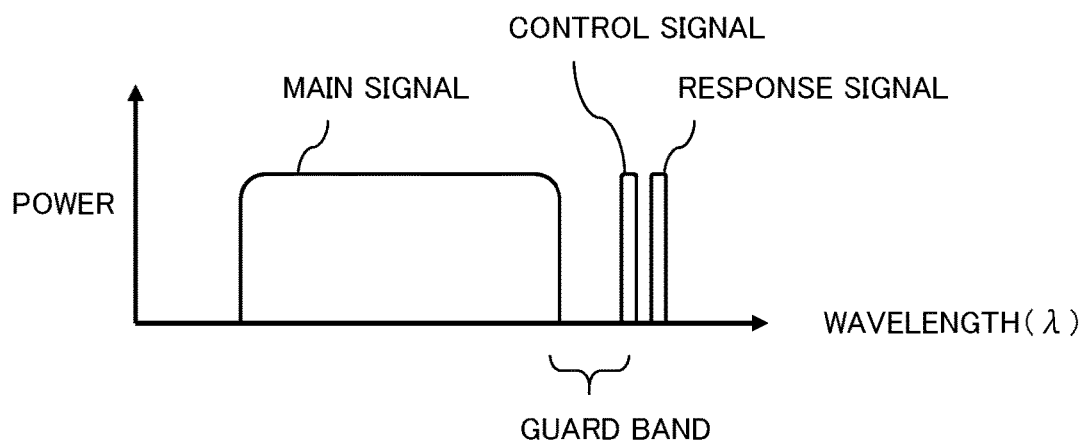
FIG. 7 is a diagram illustrating an example of wavelength arrangement of a main signal, a control signal, and a response signal.
Figure 8:
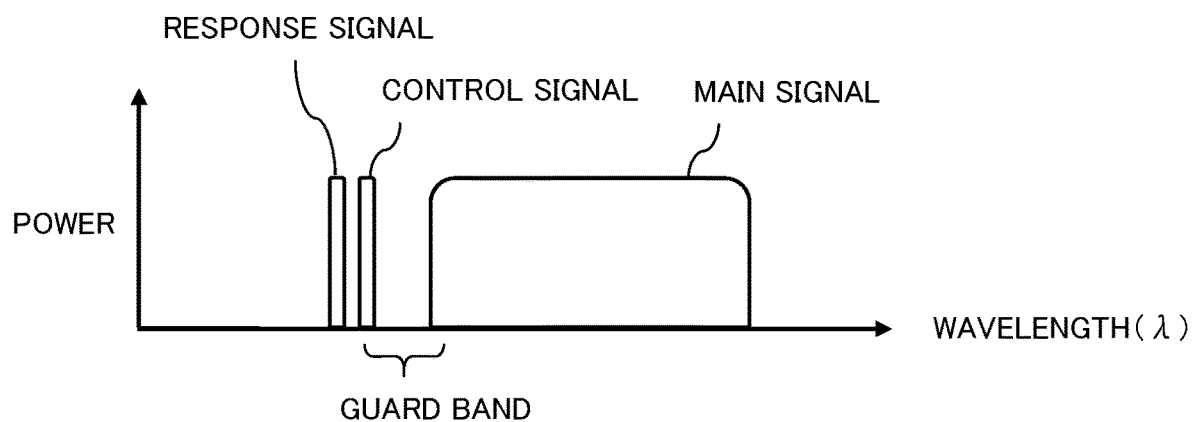
FIG. 8 is a diagram illustrating an example of wavelength arrangement of the main signal, the control signal, and the response signal.
Figure 9:
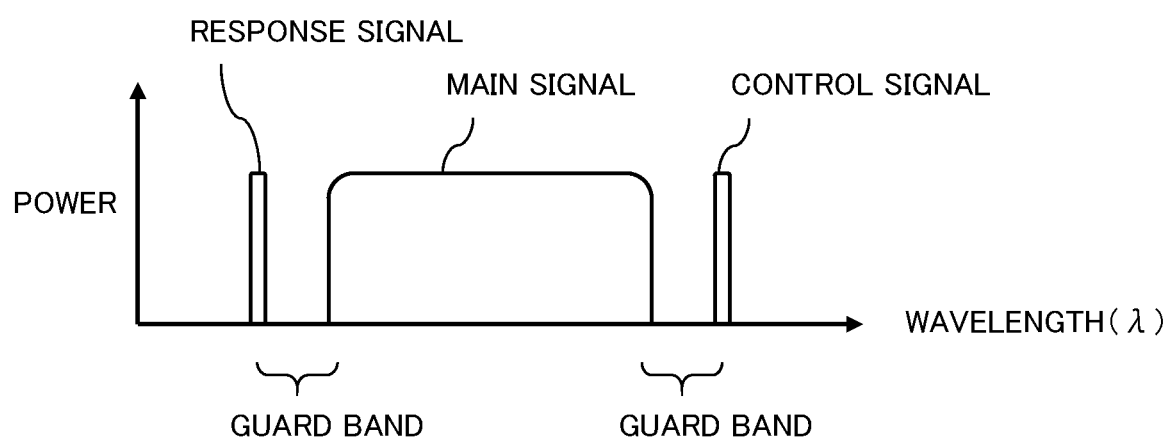
FIG. 9 is a diagram illustrating an example of wavelength arrangement of the main signal, the control signal, and the response signal.

FIG. 7 to FIG. 9 are diagrams each illustrating an example of wavelength arrangement of the main signal, the control signal, and the response signal. In each diagram, a horizontal axis indicates a wavelength (λ), and a vertical axis indicates power of the optical signal. FIG. 7 illustrates an example in which both the control signal and the response signal are arranged on a long wavelength side of the main signal. Meanwhile, FIG. 8 illustrates an example in which both the control signal and the response signal are arranged on a short wavelength side of the main signal. Between the control signal and the response signal, and the main signal, it is preferred that a guard band in which the optical signal is not arranged, be provided for the purpose of preventing interference to the main signal. In FIG. 7 and FIG. 8, any one of the control signal and the response signal may be arranged on the long wavelength side, which is freely selectable.

FIG. 9 illustrates an example in which the response signal is arranged on the short wavelength side of the main signal and the control signal is arranged on the long wavelength side of the main signal. In FIG. 9, a guard band is arranged between the wavelength band of the main signal and each of the wavelength bands of the control signal and the response signal. The response signal may be arranged on the long wavelength side of the main signal, and the control signal may be arranged on the short wavelength side of the main signal. However, it is preferred that that less wavelength bands be occupied by the guard bands for the purpose of efficiently using the wavelength bands allocated to the optical transmission system 1. Specifically, as illustrated in FIG. 7 and FIG. 8, it is preferred that the control signal and the response signal be arranged on only one of the long wavelength side and the short wavelength side of the wavelength band of the main signal.

Modification Example of Second Example Embodiment

Figure 10:
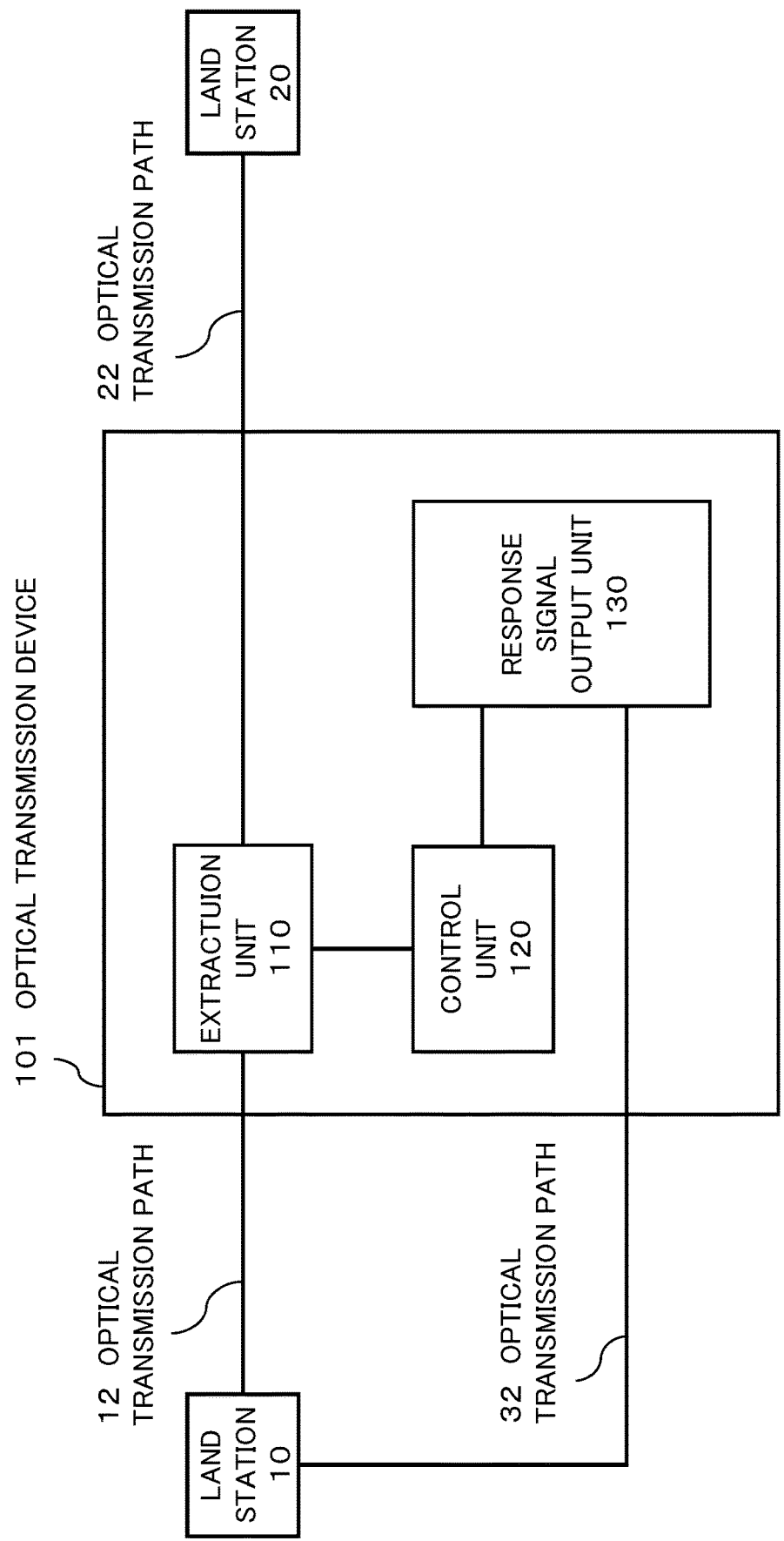
FIG. 10 is a block diagram illustrating a configuration example of an optical transmission system 2.

FIG. 10 is a block diagram illustrating a configuration example of an optical transmission system 2. An optical transmission path 32, which is different from the optical transmission paths 12 and 22, is connected to an optical transmission device 101 in the optical transmission system 2. The optical transmission path 32 connects the response signal output unit 130 and the land station 10 to each other. The optical transmission path 12 and the optical transmission path 32 may form a fiber pair. The optical transmission path 12 and the optical transmission path 32 may have different transmission directions of the optical signal. For example, when the optical transmission path 12 transmits the optical signal from the land station 10 to the optical transmission device 101, the optical transmission path 32 may transmit the optical signal from the optical transmission device 101 to the land station 10.

The land station 10 outputs the optical signal including the main signal and the control signal to the optical transmission path 12. The main signal is transmitted from the land station 10 to the land station 20 via the extraction unit 110. The control information included in the control signal is transmitted to the control unit 120 via the extraction unit 110. The control unit 120 executes the control command extracted from the control information. The response signal output unit 130 outputs the generated response signal to the optical transmission path 32 according to the control command.

In the optical transmission system 2, the optical transmission paths 12 and 32 are connected to the same land station 10. Thus, in addition to the effect of the optical transmission system 1, the optical transmission system 2 exerts an effect that whether the control command is executed can be confirmed at the land station 10 that outputs the control signal.

Third Example Embodiment

A specific example of the function block controlled by the control unit 120 is described. Optical transmission devices 102 to 105 described in the following example embodiments have the functions and the configurations of the above-described optical transmission device 100 or 101. Specifically, the optical transmission devices 102 to 105 are applicable to the optical transmission systems 1 and 2 described above.

Figure 11:
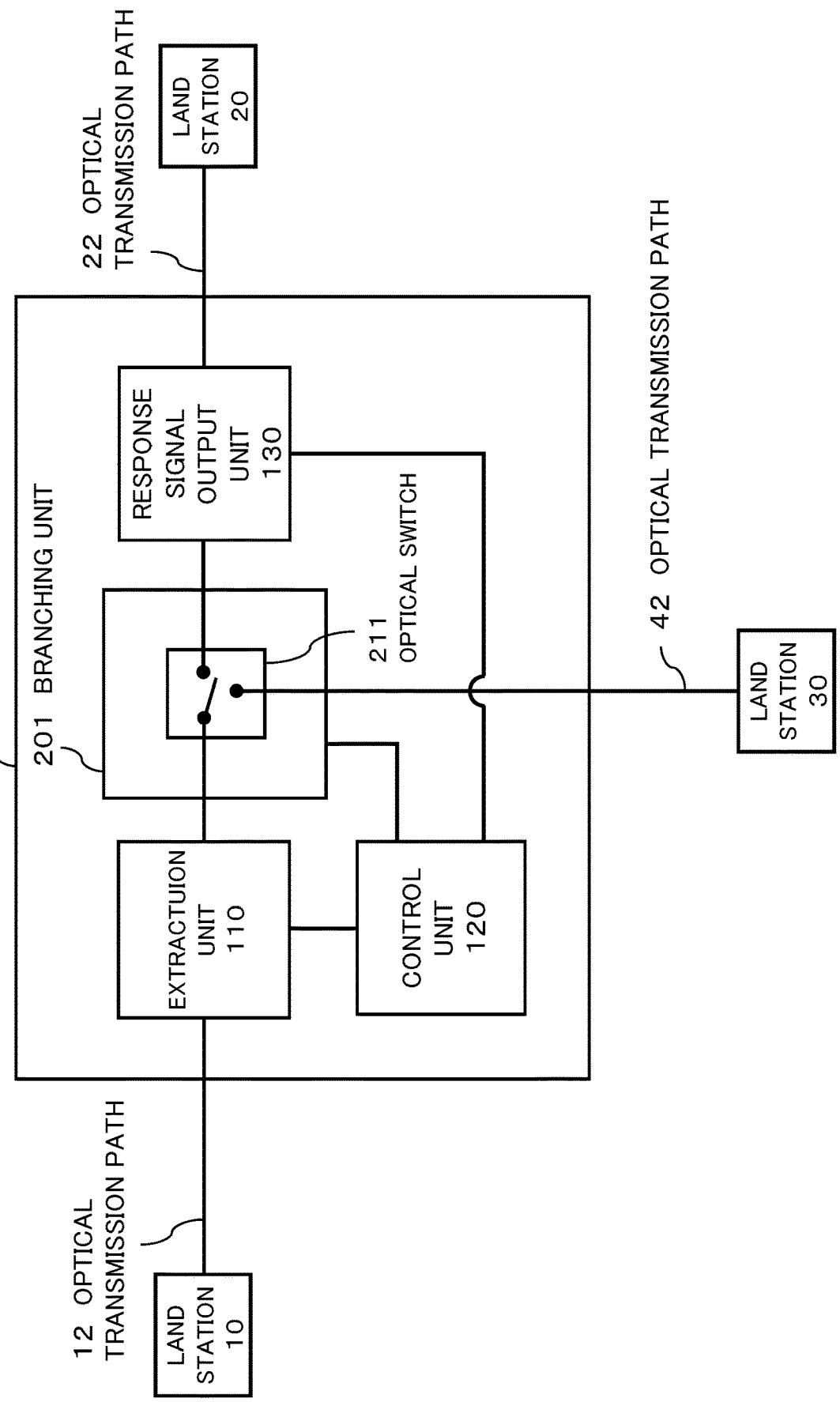
FIG. 11 is a block diagram illustrating a configuration example of an optical transmission device 102.

FIG. 11 is a block diagram illustrating a configuration example of the optical transmission device 102 of a third example embodiment of the present invention. Land stations 10 to 30 are connected to the optical transmission device 102. The optical transmission device 102 includes a branching unit 201. The branching unit 201 is one mode of the function block controlled by the control unit 120. An optical transmission path 42 connects the optical transmission device 102 and the land station 30 to each other. Similarly to the land stations 10 and 20, the land station 30 has a transmission function of the user data and a power supply function. The optical transmission path 42 may be connected to a land station other than the land station 30 or an optical transmission device.

The branching unit 201 connects an optical path inside the optical transmission device 102 in such a way that the optical signal that is input and output via the optical transmission paths 12, 22, and 42 is transmitted in a predetermined path. For example, the branching unit 201 includes an optical switch 211. The optical switch 211 is a 1×2 optical switch. In the configuration example of FIG. 11, the optical switch 211 connects the optical transmission path 12, which is connected thereto via the extraction unit 110, and the optical transmission path 22, which is connected thereto via the response signal output unit 130, to each other. Alternatively, the optical switch 211 connects the optical transmission path 12 and the optical transmission path 42 to each other. The control unit 120 forms a predetermined path by controlling the optical switch 211, based on a control command associated with an address of the optical switch 211.

After executing the control command for controlling the optical switch 211, the control unit 120 instructs the response signal output unit 130 to generate a response signal. When the optical switch 211 is connected to the optical transmission path 42, the main signal is output to the land station 30, and only the response signal is output to the optical transmission path 22. As described above, even when the optical transmission device 102 does not have one or both of a main signal photo-electric conversion function and a main signal optical amplification function, the optical transmission device 102 can generate the response signal and output the response signal to the optical transmission path 22. As a result, based on the content of the response signal, the land station 20 connected to the optical transmission device 102 can confirm that control for the branching unit 201 is executed in the optical transmission device 102.

Fourth Example Embodiment

Figure 12:
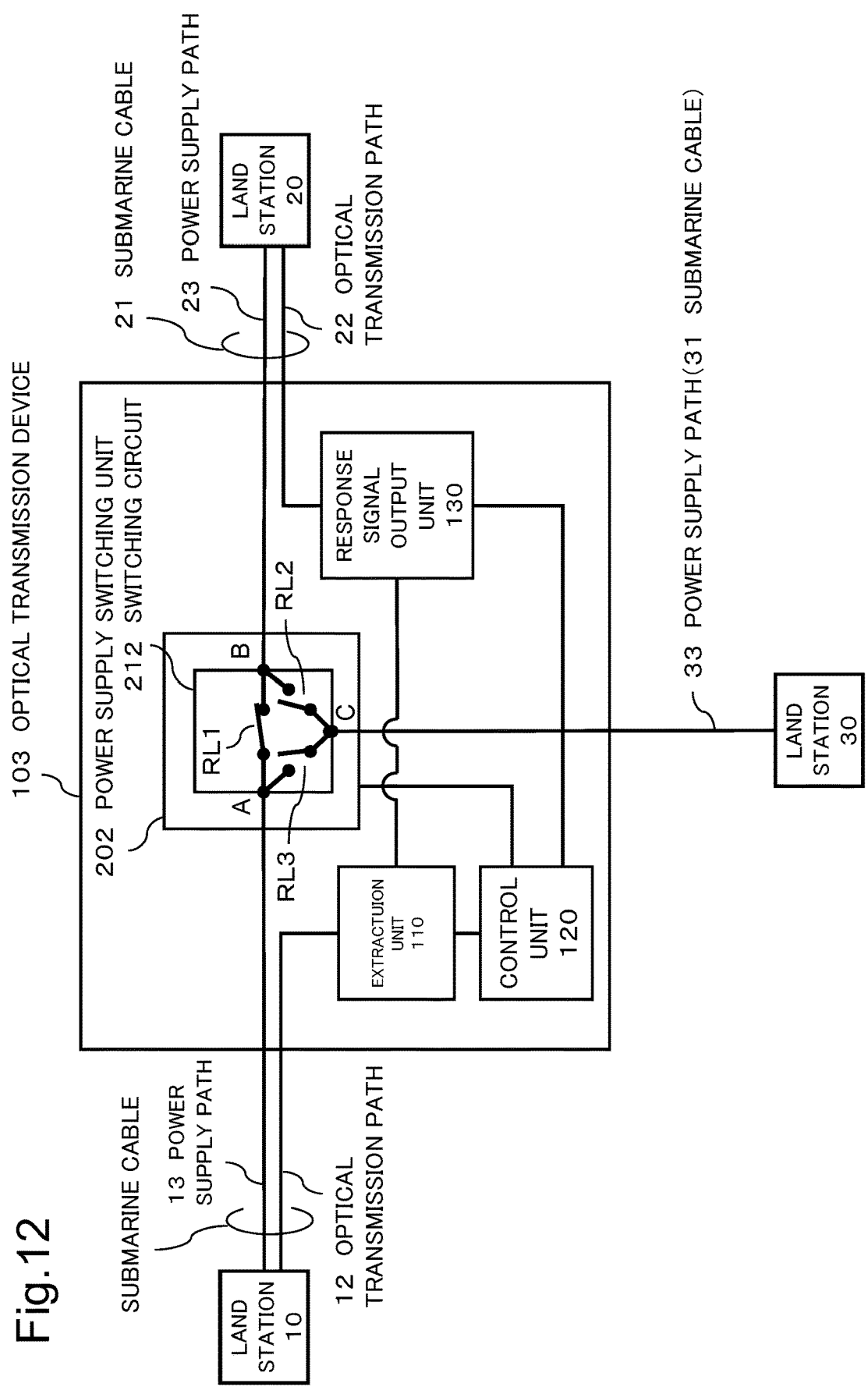
FIG. 12 is a block diagram illustrating a configuration example of an optical transmission device 103.

FIG. 12 is a block diagram illustrating a configuration example of the optical transmission device 103 of a fourth example embodiment of the present invention. In place of the branching unit 201 of the optical transmission device 102, the optical transmission device 103 includes a power supply switching unit 202. The power supply switching unit 202 is one mode of the function block controlled by the control unit 120. The optical transmission device 102 and the land stations 10, 20, and 30 are connected to each other via submarine cables 11, 21 and 31, respectively. Power supply paths 13, 23, and 33 are included in the submarine cables 11, 21, and 31, respectively. The power supply switching unit 202 switches a power supply path including any two paths of the power supply paths 13, 23, and 33. The power supply switching unit 202 includes a switching circuit 212. Terminals A, B, and C of the switching circuit 212 are connected to the power supply paths 13, 23, and 33, respectively. The submarine cable 31 may be connected to a land station other than the land station 30.

When the power supply paths 13 and 23 are normal, the switching circuit 212 closes a first relay RL1, and thus connects the terminal A and the terminal B to each other. In this case, the optical transmission device 103 is supplied with power via the power supply path between the land station 10 and the land station 20. Further, when the power supply path 13 is abnormal, and the power supply paths 23 and 33 are normal, the switching circuit 212 closes a second relay RL2, and thus connects the terminal B and the terminal C to each other. In this case, the optical transmission device 103 is supplied with power via the power supply path between the land station 20 and the land station 30. The switching circuit 212 only switches the power supply path, and hence transmission of the optical signal between the land station 10 and the land station 20 is not affected by an operation of the switching circuit 212. Further, when the power supply path 23 is abnormal, and the power supply paths 13 and 33 are normal, the switching circuit 212 closes a third relay RL3, and thus connects the terminal C and the terminal A to each other. In this case, the optical transmission device 103 is supplied with power via the power supply path between the land station 10 and the land station 30.

The control unit 120 executes the control command with respect to the switching circuit 212, and thus executes those control operations with respect to the switching circuit 212. Further, the control unit 120 instructs the response signal output unit 130 to generate a response signal according to execution of the control command for controlling the switching circuit 212. Therefore, even when the optical transmission device 103 does not have one or both of a main signal photo-electric conversion function and a main signal optical amplification function, the optical transmission device 103 can generate the response signal and output the response signal to the optical transmission path 22. As a result, based on the content of the response signal, the land station 20 connected to the optical transmission device 103 can confirm that the power supply path is switched in the optical transmission device 103.

Figure 13:
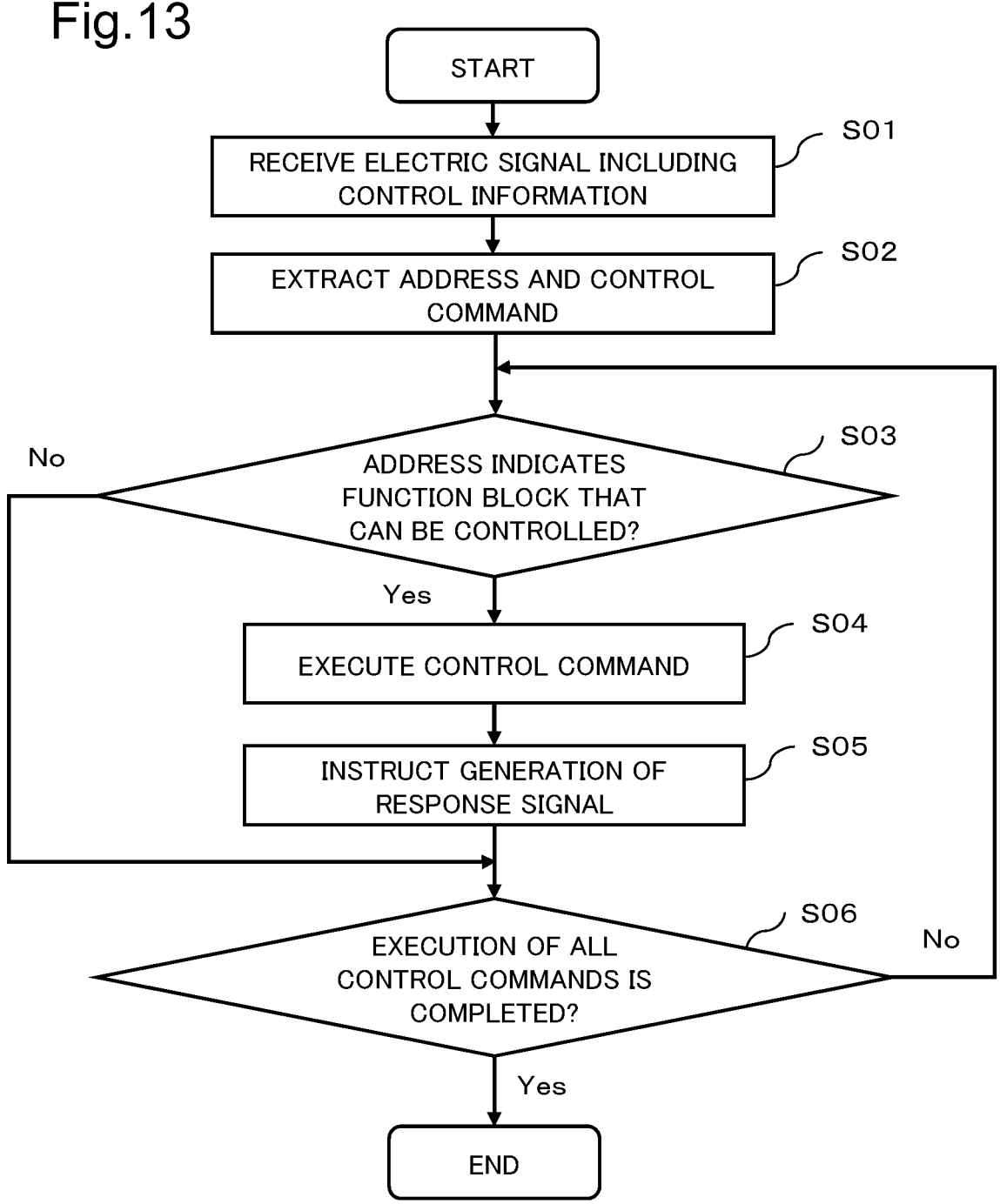
FIG. 13 is a flowchart illustrating an example of a control procedure of the control unit 120 of the optical transmission device 103.

FIG. 13 is a flowchart illustrating an example of a control procedure of the control unit 120 of the optical transmission device 103. The processing in Steps S01 to S05 is similar to FIG. 6, but is different from FIG. 6 in that Step S06 is included in FIG. 13.

When different control commands are sequentially executed with respect to one function block, or the optical transmission device includes a plurality of function blocks, a plurality pieces of control information are extracted in some cases. For example, as illustrated in FIG. 12, in a configuration in which the terminals A and B, the terminals B and C, and the terminals C and A of the switching circuit 212 are connected to each other via the first relay RL1, the second relay RL2, and the third relay RL3, respectively, the power supply path is switched by opening and closing the relays RL1 to RL3. The land station 10 generates a control signal including a plurality of control commands for instructing an "opened" state or a "closed" state with respect to the relays. Further, in Step S02 of FIG. 13, control information (specifically, an address and a control command) associated with each relay is extracted, and is stored in the control unit 120.

For example, when control for connecting the power supply path 13 and the power supply path 23 to each other is executed, the land station 10 transmits a control signal including a control command 1 for setting the first relay RL1 in the "closed" state in such a way as to connect the terminals A and B to each other. The control signal further includes a control command 2 for setting the second relay RL2 in the "opened" state in such a way as to disconnect the terminals B and C from each other, and a control command 3 for setting the third relay RL3 in the "opened" state in such a way as to disconnect the terminals C and A from each other. The control unit 120 extracts the control commands 1 to 3 as information associated with the addresses of the relays RL1 to RL3, and stores the information.

In Step S03, it is determined whether the addresses extracted in Step S02 indicate a function block that can be controlled by the control unit 120. This determination may be executed sequentially with respect to unexecuted control commands stored in the control unit 120. Based on the determination result, the control unit 120 may store only control information including an address that can be controlled. The relays RL1 to RL3 can be controlled by the control unit 120, and thus the procedure with respect to the control commands 1 to 3 described above proceeds to Step S04. In Step S04, the control command (for example, any one of the control commands 1, 2, and 3 described above) is executed. In Step S05, generation of a response signal is instructed every time one control command is executed.

In Step S06, it is confirmed whether execution of all the control commands extracted by and stored in the control unit 120 is completed. When there is an unexecuted control command, the procedure from Step S03 to Step S06 is repeated. When all the control commands that can be controlled by the control unit 120 are executed, the procedure is terminated.

Figure 14:
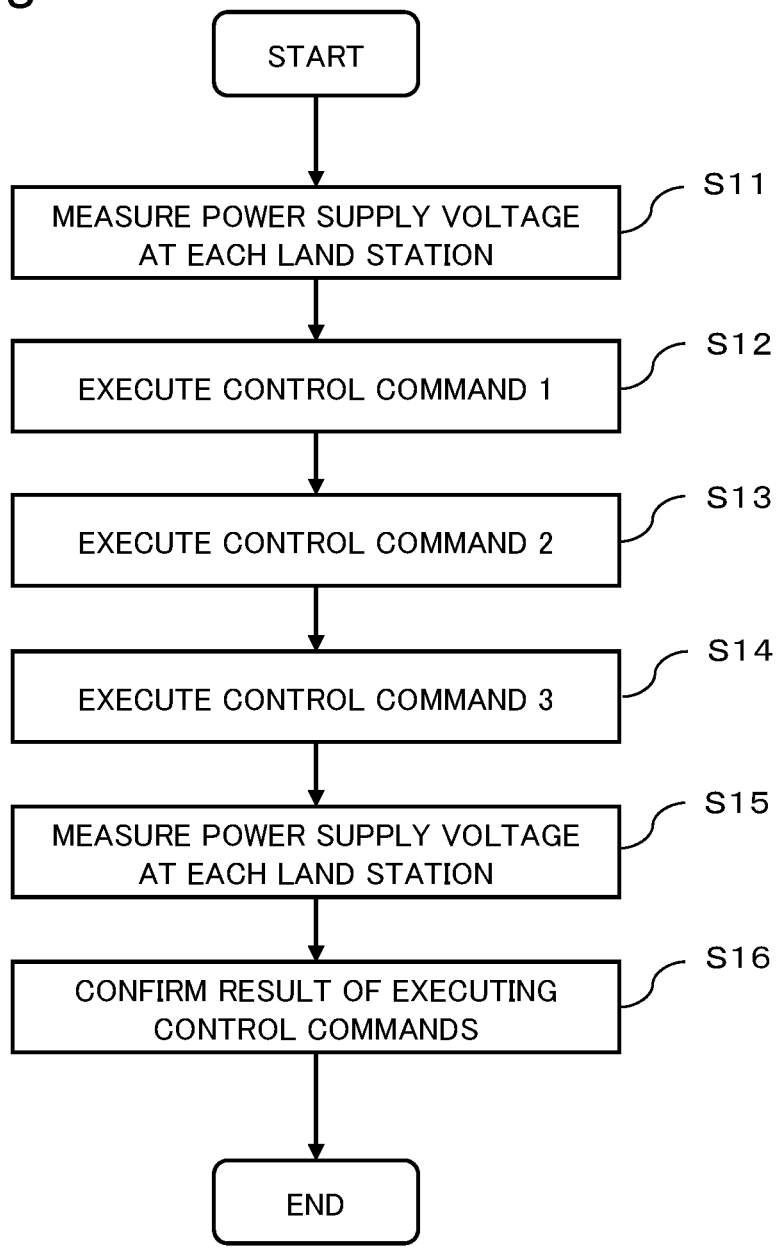
FIG. 14 is a diagram illustrating an execution procedure of control commands for a power supply path in a general submarine branching device.

An effect exerted by generating the response signal every time the control command is executed is described with an example of power supply path switching. FIG. 14 is a diagram illustrating a procedure of executing a control command for a power supply path in a general submarine branching device. In some cases, the general submarine branching device also executes control (for example, switching of an optical transmission path or a power supply path) for a submarine branching device, based on a control command received from a land station. However, the general submarine branching device does not have a function of issuing a response signal with respect to the control command. Thus, for example, when the power supply path is switched, change in power supply voltage before the control command is executed and after all the control commands are executed is observed at each land station, and thus execution of the control command is confirmed.

As illustrated in FIG. 14, when the power supply path is switched in the general submarine branching device, power supply voltages at all land stations relevant to power supply are measured before a first control command (control command 1) is transmitted (Step S11). After that, the control commands 1 to 3 are executed in a row (Steps S12 to S14). For example, when a switching circuit of the general submarine branching device includes three relays RL1 to RL3 similarly in the present example embodiment, the control command 1 for controlling the relay RL1, the control command 2 for controlling the relay RL2, and the control command 3 for controlling the relay RL3 are executed in a row. Further, after the control command 3 is executed, the power voltages at all the land stations relevant to power supply are measured again (Step S15). An operator of a system in which the general submarine branching device is installed collects changed amounts of the power supply voltages at the land stations, and confirms an execution result of the control commands, based on the changed amounts (Step S16). In Step S16, when the changed amounts of the power supply voltages substantially match with previously estimated changed amounts in a state in which the control commands 1 to 3 are normally executed, it is determined that the control commands 1 to 3 are normally executed.

However, in the procedure in FIG. 14, when any of the plurality of control commands is not executed, the unexecuted control command cannot be specified. Meanwhile, when measurement of the power supply voltages is executed every time a control command is executed, change in power supply voltage for each control command execution can be grasped. However, when the control commands are executed in a row, it is required to measure a power supply voltage at each land station and collect the result every time the control command is executed, and hence quick execution of the plurality of control commands is difficult. Further, in a case of only one control command, even when the command is executed, the power supply voltage is not changed, or a changed amount is small in some cases. Further, the power supply voltage may be changed due to various reasons other than switching of the power supply path, and hence it is difficult to determine whether the change in power supply voltage is caused by execution of a control command, in some cases. Specifically, when a plurality of control commands are executed, the general submarine branching device cannot quickly and accurately confirm whether individual control commands are executed.

Figure 15:
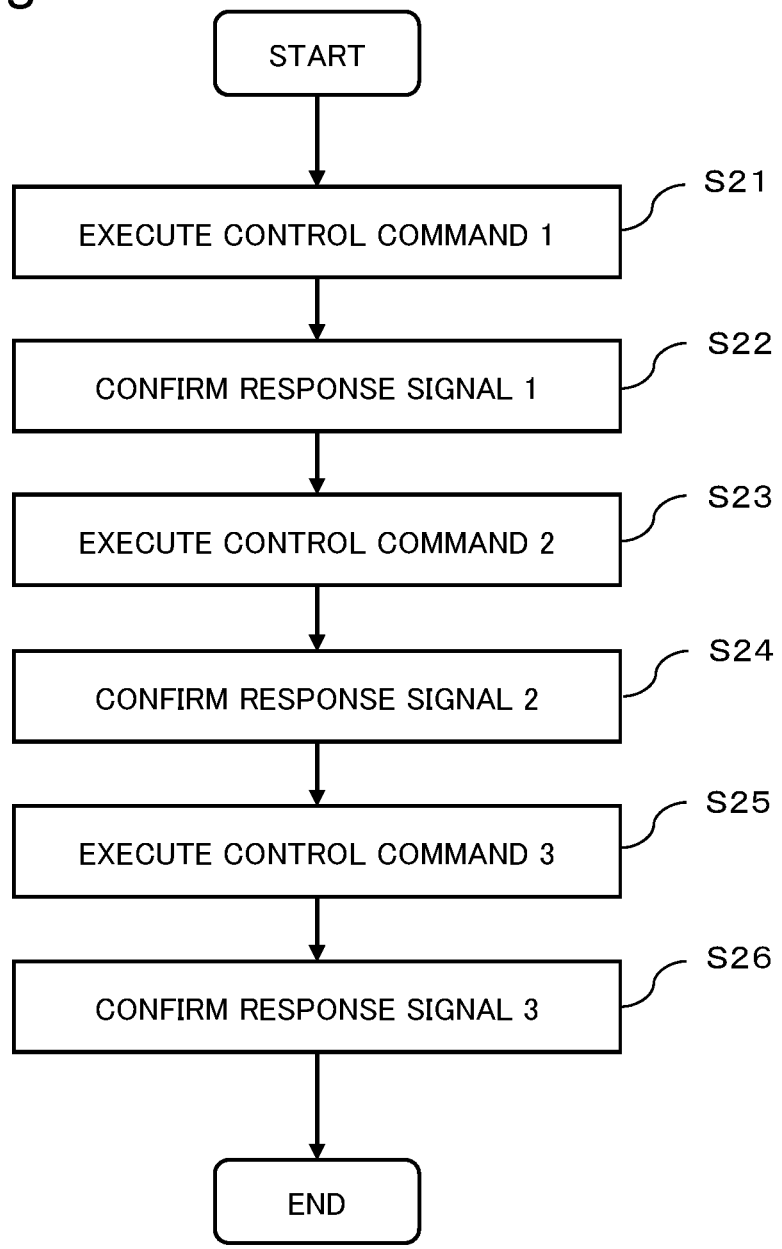
FIG. 15 is a diagram illustrating an example of a flow of executing control commands and confirming response signals.

In contrast, in the configuration and the procedure of the present example embodiment, as described in Steps S04 and S05 in FIG. 13, the control unit 120 instructs the response signal output unit 130 to generate the response signal every time the control command is executed. FIG. 15 is a diagram illustrating an example of flow of executing the control commands and confirming the response signals in the present example embodiment. When the control commands 1, 2, and 3 are sequentially executed (Steps S21, S23, and S25 in FIG. 15), associated response signals 1, 2, and 3 are sequentially generated after execution of the control commands, and are transmitted to the land station 20. The land station 20 receives the response signals 1 to 3, and confirms contents thereof (Steps S21, S23, and S25). The response signals include contents regarding the control command executed directly before and the associated address. For example, the response signal 1 is generated to include a content regarding the control command 1 and the address of the control target in the field of the response information illustrated in FIG. 5. Similarly, the response signal 2 includes a content regarding the control command 2 and the associated address, and the response signal 3 includes a content regarding the control command 3 and the associated address. Therefore, an operator of an optical transmission system in which the optical transmission device 103 is installed analyzes the contents of the response signals 1 to 3 at the land station 20, and thus can quickly and accurately confirm a control execution result for each control command with respect to the optical transmission device 103. Further, as described in FIG. 10, when receiving the response signal at the land station 10, an operator can transmit the control signal and receive the response signal at the same location. Specifically, even when the optical transmission device 103 does not have one or both of a main signal photo-electric conversion function and a main signal optical amplification function, the optical transmission device 103 can output, to the land station, the response signal according to control for the power supply switching unit 202.

Fifth Example Embodiment

Figure 16:
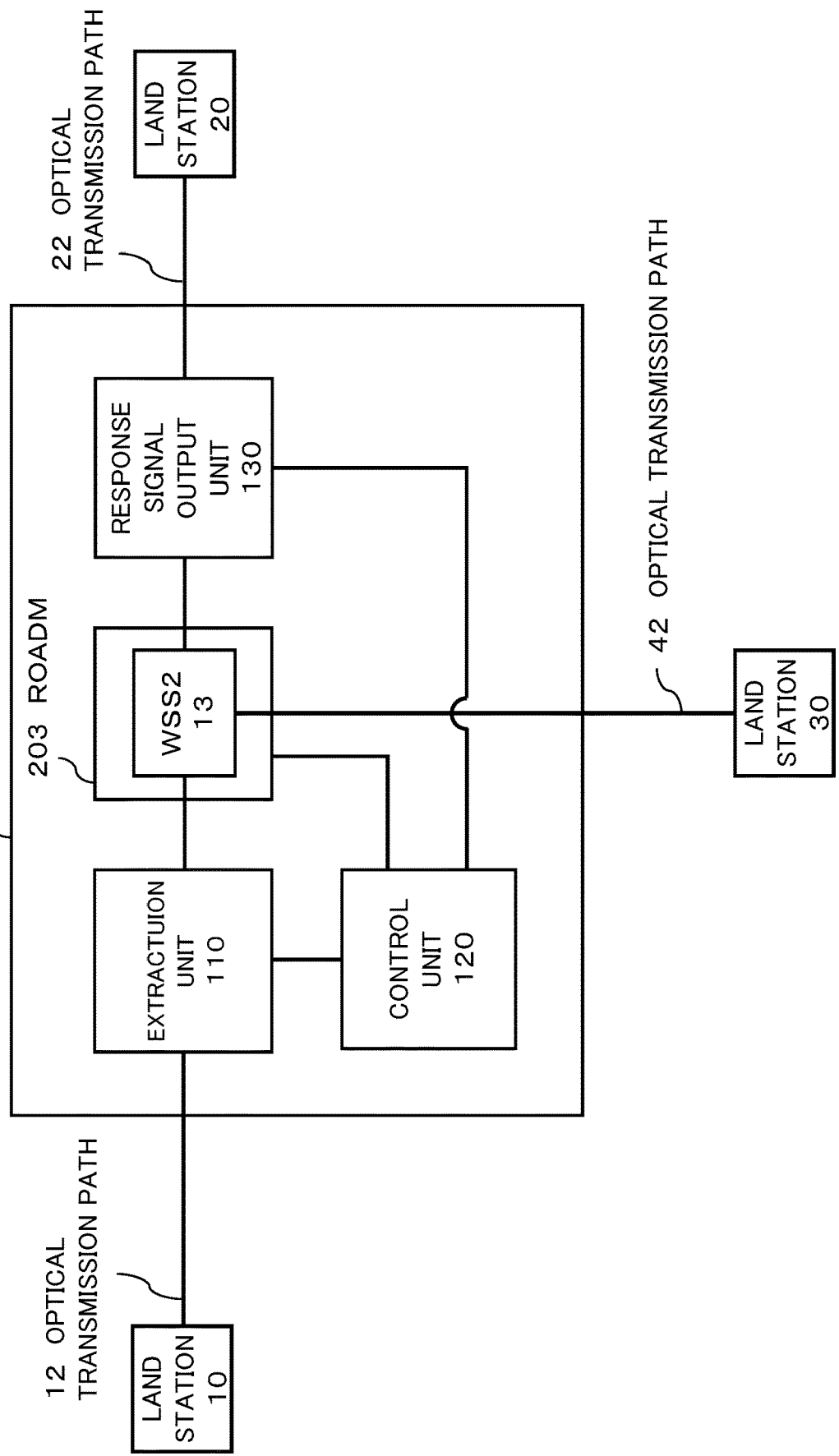
FIG. 16 is a block diagram illustrating a configuration example of an optical transmission device 104.

FIG. 16 is a block diagram illustrating a configuration example of the optical transmission device 104 of a fifth example embodiment of the present invention. As compared to the optical transmission device 102 illustrated in FIG. 11, the optical transmission device 104 includes a reconfigurable optical add-drop multiplexer (ROADM) 203 in place of the branching unit 201. The ROADM 203 is one mode of the function block controlled by the control unit 120.

According to control from the control unit 120, the ROADM 203 demultiplexes a WDM signal into a plurality of optical transmission paths according to a wavelength or generates a WDM signal by multiplexing input optical signals from a plurality of optical transmission paths. The control unit 120 controls the ROADM 203 according to the control command extracted from the control signal received from the optical transmission path 12, and thus controls the path of the optical signal input and output in the optical transmission device 104 for each wavelength of a carrier included in the optical signal.

The function of the ROADM 203 may be achieved with a wavelength selective switch (WSS) 213. For example, the WSS 213 separates the WDM signal, which is input from the optical transmission path 12, by wavelength according to the control command received from the control unit 120, and outputs the signal to the optical transmission paths 22 and 42. Further, the WSS 213 can multiplex the optical signals, which are input from the optical transmission paths 22 and 42, by wavelength according to the control command, and can output the WDM signal to the optical transmission path 12.

After executing control for the ROADM 203, the control unit 120 instructs the response signal output unit 130 to generate a response signal. Therefore, even when the optical transmission device 104 does not have one or both of a main signal photo-electric conversion function and a main signal optical amplification function, the optical transmission device 104 can generate the response signal according to control for the ROADM 203, and can output the response signal to the optical transmission path 22. As a result, based on the content of the response signal, the land station 20 can confirm that control for the ROADM 203 is executed.

Sixth Example Embodiment

Figure 17:
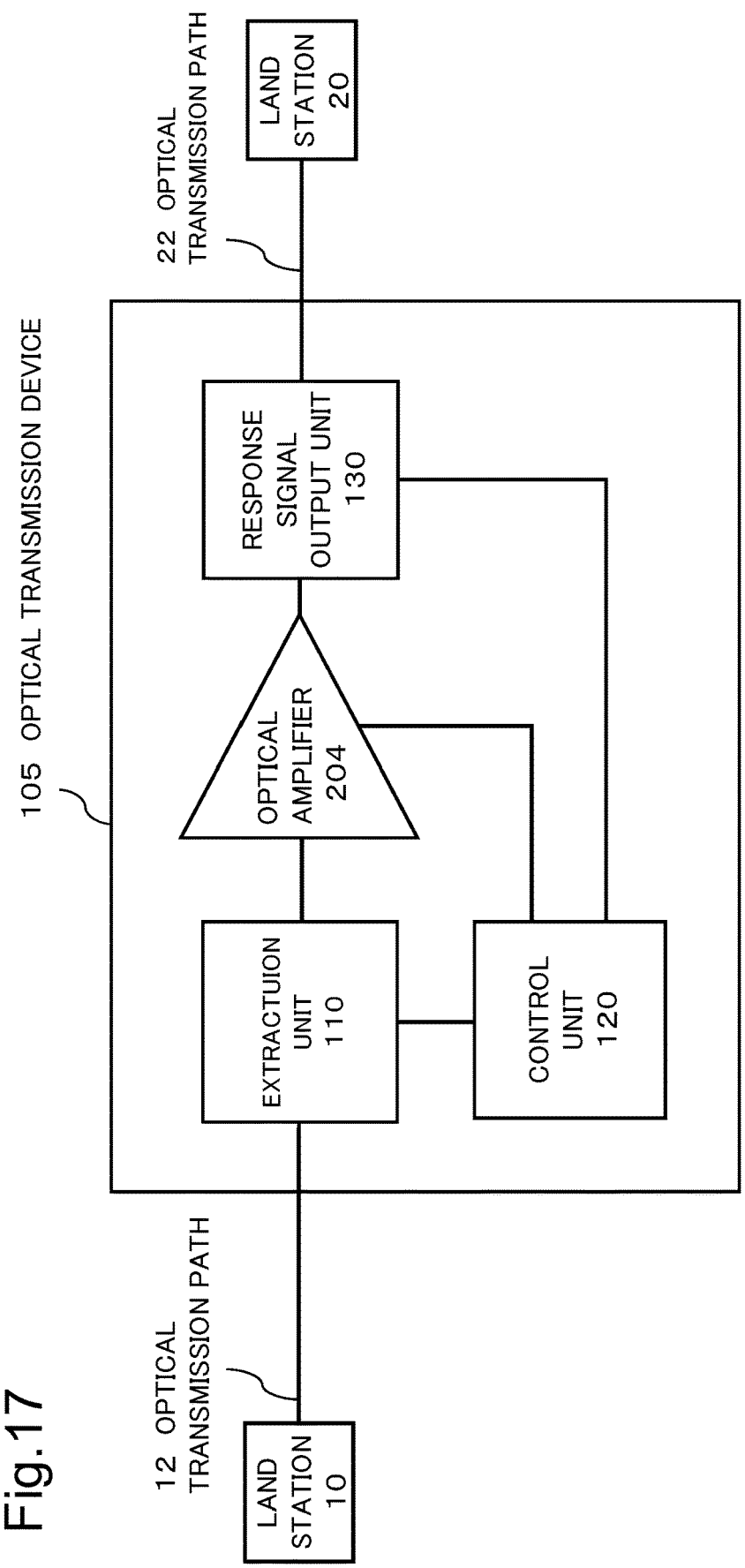
FIG. 17 is a block diagram illustrating a configuration example of an optical transmission device 105.

FIG. 17 is a block diagram illustrating a configuration example of the optical transmission device 105 of a sixth example embodiment of the present invention. As compared to the optical transmission device 102, the optical transmission device 105 includes an optical amplifier 204 in place of the branching unit 201. The optical amplifier 204 is one mode of the function block controlled by the control unit 120.

The optical amplifier 204 amplifies the optical signal input from the optical transmission path 12 via the extraction unit 110. The function of the optical amplifier 204 may be achieved with an erbium-doped fiber amplifier (EDFA). The optical amplifier 204 includes an excitation light source and an erbium-doped fiber (EDF). The amplified optical signal is output to the optical transmission path 22 via the response signal output unit 130. The control unit 120 controls drive electric current of the excitation light source according to the control command extracted from the control signal received from the land station 10, and thus can control gains and output power of the optical amplifier 204.

After executing control for the optical amplifier 204, the control unit 120 instructs the response signal output unit 130 to generate a response signal. Therefore, the optical transmission device 105 including such a configuration is not necessarily required to have a main signal photo-electric conversion function, and can generate the response signal according to control for the optical amplifier 204 and can output the response signal to the optical transmission path 22. Further, the optical transmission device 105 can output the response signal to the optical transmission path 22 without using the optical amplifier 204 when generating the response signal. Specifically, the optical transmission device 105 is not necessarily required to have one or both of a main signal photo-electric conversion function and a main signal optical amplification function, for the purpose of generating the response signal. Further, based on the content of the response signal, the land station 20 can confirm that control for the optical amplifier 204 is executed.

Note that a response signal described in PTL 2 is generated by modulating excitation light of an optical amplifier that amplifies a main signal. Thus, when the response signal is modulated deeply, the main signal may be affected. However, as illustrated in FIG. 7 to FIG. 9, the response signal of the present example embodiment is an optical signal in a wavelength band different from that of the main signal. Thus, the response signal generated in the optical transmission device 105 of the present example embodiment less affects the main signal as compared to the response signal described in PTL 2. Further, unlike the technique described in PTL 2, which requires an optical fiber amplifier, the optical transmission device 105 is applicable to the optical amplifier 204 being an optical amplifier without an excitation light source (for example, a semiconductor optical amplifier). When the optical amplifier 204 is a semiconductor optical amplifier, the control command is for controlling drive electric current of the semiconductor optical amplifier.

Description is made on a configuration in which the optical transmission devices 102 to 105 include the branching unit 201, the power supply switching unit 202, the ROADM 203, or the optical amplifier 204 as an example of the function block. However, the examples do not limit the configurations and functions of the function blocks. Other functions included in the optical transmission device may be a control target of the control command.

An example in which the optical transmission devices 102 to 105 each include one function block is described above. However, the optical transmission devices 102 to 105 may each include a plurality of function blocks. The plurality of function blocks are provided with different addresses, and thus a function block being a target for executing the control command can be identified with its address. When a plurality of control commands with respect to a plurality of function blocks are extracted from the control signal, the procedure of generating the response signal every time the control command is executed may be applied, which is described with reference to FIG. 13 and FIG. 15.

Seventh Example Embodiment

Figure 18:
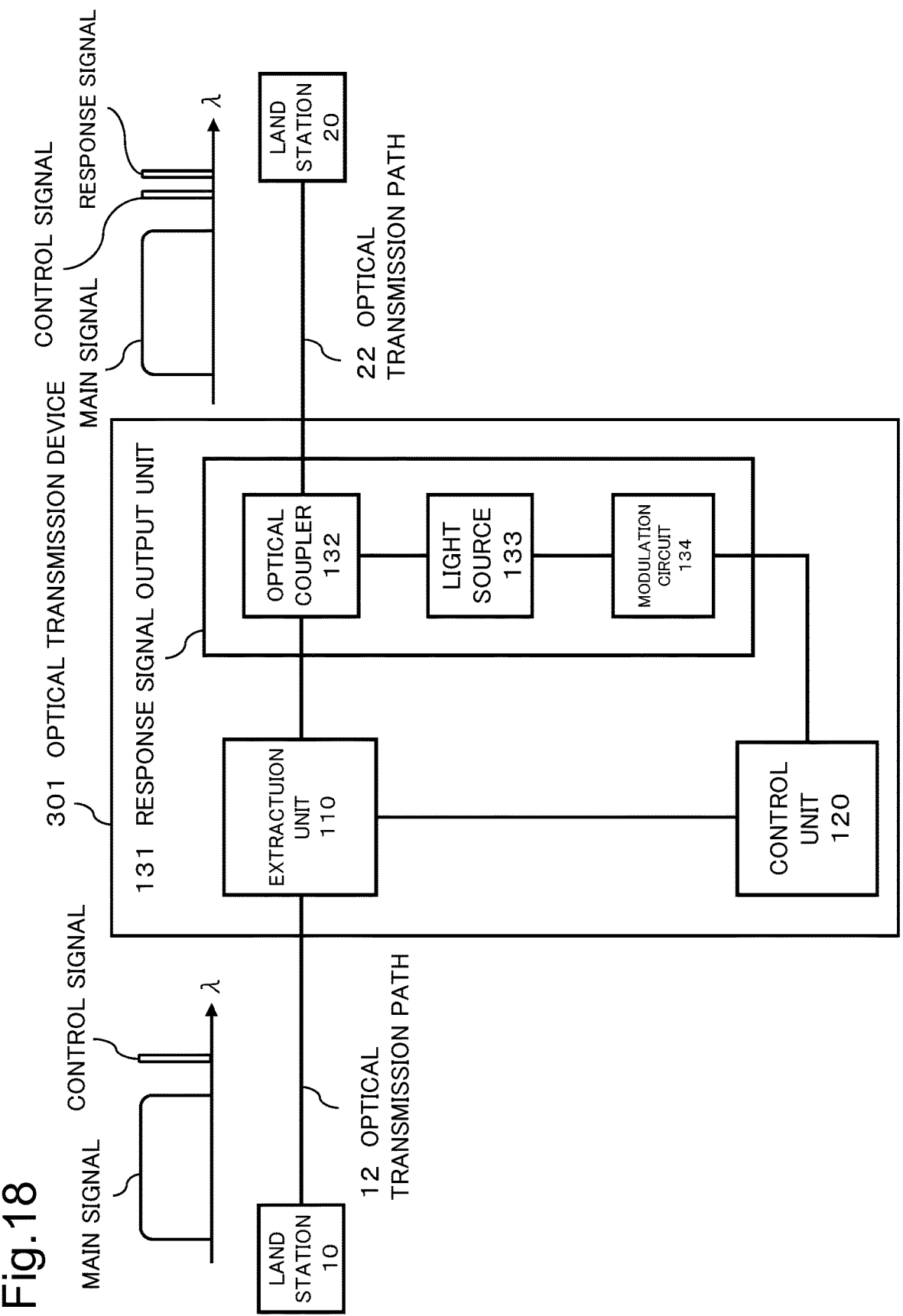
FIG. 18 is a block diagram illustrating a configuration example of an optical transmission device 301.

In the following example embodiments, description is made on a specific configuration example of the response signal output unit 130 included in the optical transmission devices described in the first to sixth example embodiments. FIG. 18 is a block diagram illustrating a configuration example of an optical transmission device 301 of a seventh example embodiment of the present invention. Description for the function block controlled by the control unit 120 is omitted. A response signal output unit 131 included in the optical transmission device 301 is one specific configuration example of the response signal output unit 130.

The response signal output unit 131 includes an optical coupler 132, a light source 133, and a modulation circuit 134. The land station 10 and the land station 20 are connected to the optical transmission paths 12 and 22, respectively. The land station 10 outputs the main signal and the control signal to the optical transmission path 12. The examples of the first to sixth example embodiments are applicable to the configurations and the operations of the extraction unit 110 and the control unit 120. Specifically, the extraction unit 110 outputs the electric signal including the control information to the control unit 120. The control unit 120 executes the control command included in the control information, and outputs the response information as an instruction for generating a response signal to the response signal output unit 131. Examples of the control information and the response information are illustrated in FIG. 5.

In the optical transmission device 301, the response information is input to the modulation circuit 134 included in the response signal output unit 131. The modulation circuit 134 generates a modulation signal for subjecting light, which is output from the light source 133, to intensity modulation according to the response information, and outputs the modulation signal to the light source 133. The light source 133 is an electro-optical conversion element (for example, a laser diode) for generating light in a wavelength band of the response signal. The wavelength band of the light source 133 is different from any of the wavelength band of the main signal and the wavelength band of the control signal. The light source 133 generates an optical signal as the response signal, which is subjected to intensity modulation according to the modulation signal. For example, the optical coupler 132 is an optical directional coupler using an optical fiber or an optical waveguide. The optical coupler 132 couples the optical signal, which is output from the optical coupler 111 included in the extraction unit 110, and the response signal, which is generated by the light source 133, and outputs the resultant signal to the optical transmission path 22.

The response signal output unit 131 of the optical transmission device 301 modulates the light output from the light source 133, and thus generates the response signal. With this, even when the optical transmission device 301 does not have one or both of a main signal photo-electric conversion function and a main signal optical amplification function, the optical transmission device 301 can generate the response signal. Further, in place of the response signal output unit 130 of the optical transmission devices 100 to 105 described above, the response signal output unit 131 described in the present example embodiment can be used. Further, the functions and the effects of the optical transmission devices 100 to 105 can also be achieved by including the response signal output unit 131.

Eighth Example Embodiment

Figure 19:
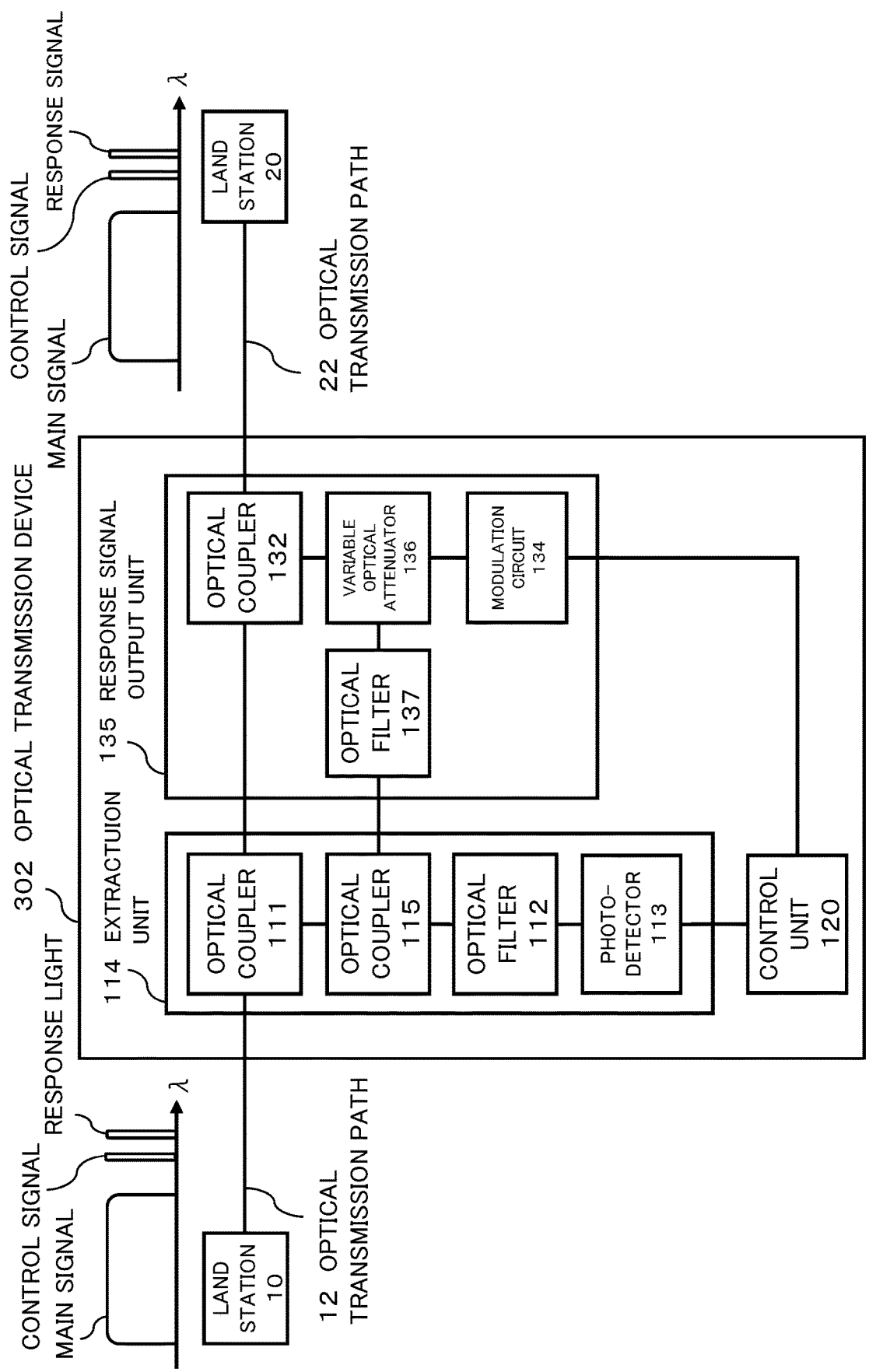
FIG. 19 is a block diagram illustrating a configuration example of an optical transmission device 302.

FIG. 19 is a block diagram illustrating a configuration example of an optical transmission device 302 of an eighth example embodiment of the present invention. In the present example embodiment, description is made on the response signal output unit 135 being further another configuration example of the response signal output unit 130 and an extraction unit 114 being another configuration example of the extraction unit 110 illustrated in FIG. 3.

The extraction unit 114 includes an optical coupler 115 between the optical coupler 111 and the optical filter 112. Further, the response signal output unit 135 includes the optical coupler 132, a variable optical attenuator 136, the modulation circuit 134, and an optical filter 137. Description for the function block controlled by the control unit 120 is omitted. The land station 10 and the land station 20 are connected to the optical transmission paths 12 and 22, respectively. In the present example embodiment, the land station 10 has a function of transmitting response light to the optical transmission path 12, in addition to the main signal and the control signal. The response light is continuous light in a wavelength band of the response signal, which is not modulated.

The optical transmission device 302 receives the main signal, the control signal, and the response light from the optical transmission path 12. For example, each of the optical couplers 111 and 115 is an optical directional coupler using an optical fiber or an optical waveguide. The optical coupler 115 further splits one part of the optical signal, which is split into two by the optical coupler 111, into two, and outputs the resultant signal to the optical filter 112 and the optical filter 137. Specifically, the optical signal including the main signal, the control signal, and the response light is input to the optical filter 112 and the optical filter 137 via the optical couplers 111 and 115. The optical filter 137 allows only light in a wavelength of the response light to pass therethrough. Specifically, the optical filter 137 outputs the response light to the variable optical attenuator 136. Note that, as described above, the optical filter 112 is an optical filter that selectively allows light in the wavelength band of the control signal to pass therethrough.

The control unit 120 executes the control command included in the control information, and outputs the response information as an instruction for generating the response signal to the response signal output unit 131. The modulation circuit 134, according to the response information, generates the modulation signal for subjecting the response light to intensity modulation at the variable optical attenuator 136, and outputs the modulation signal to the variable optical attenuator 136. The variable optical attenuator 136 is an optical attenuator capable of controlling an attenuation amount of the input light according to the modulation signal. The variable optical attenuator 136 subjects the response light, which is input from the optical filter 137, to intensity modulation according to the modulation signal, and generates the response signal. The optical coupler 132 couples the other part of the optical signal, which is split into two by the optical coupler 111, and the response signal, which is output from the variable optical attenuator 136, and outputs the resultant signal to the optical transmission path 22.

In the present example embodiment, the land station 10 transmits, to the optical transmission path 12, the optical signal including the response light in a wavelength band similar to the wavelength band of the response signal. Further, the optical transmission device 302 modulates the response light extracted from the received optical signal, and thus generates the response signal. With this configuration, even when the optical transmission device 302 does not include a part or all of a main signal photo-electric conversion function, a main signal optical amplification function, and a light source for generating a response signal, the optical transmission device 302 can generate the response signal.

Modification Example of Eighth Example Embodiment

Figure 20:
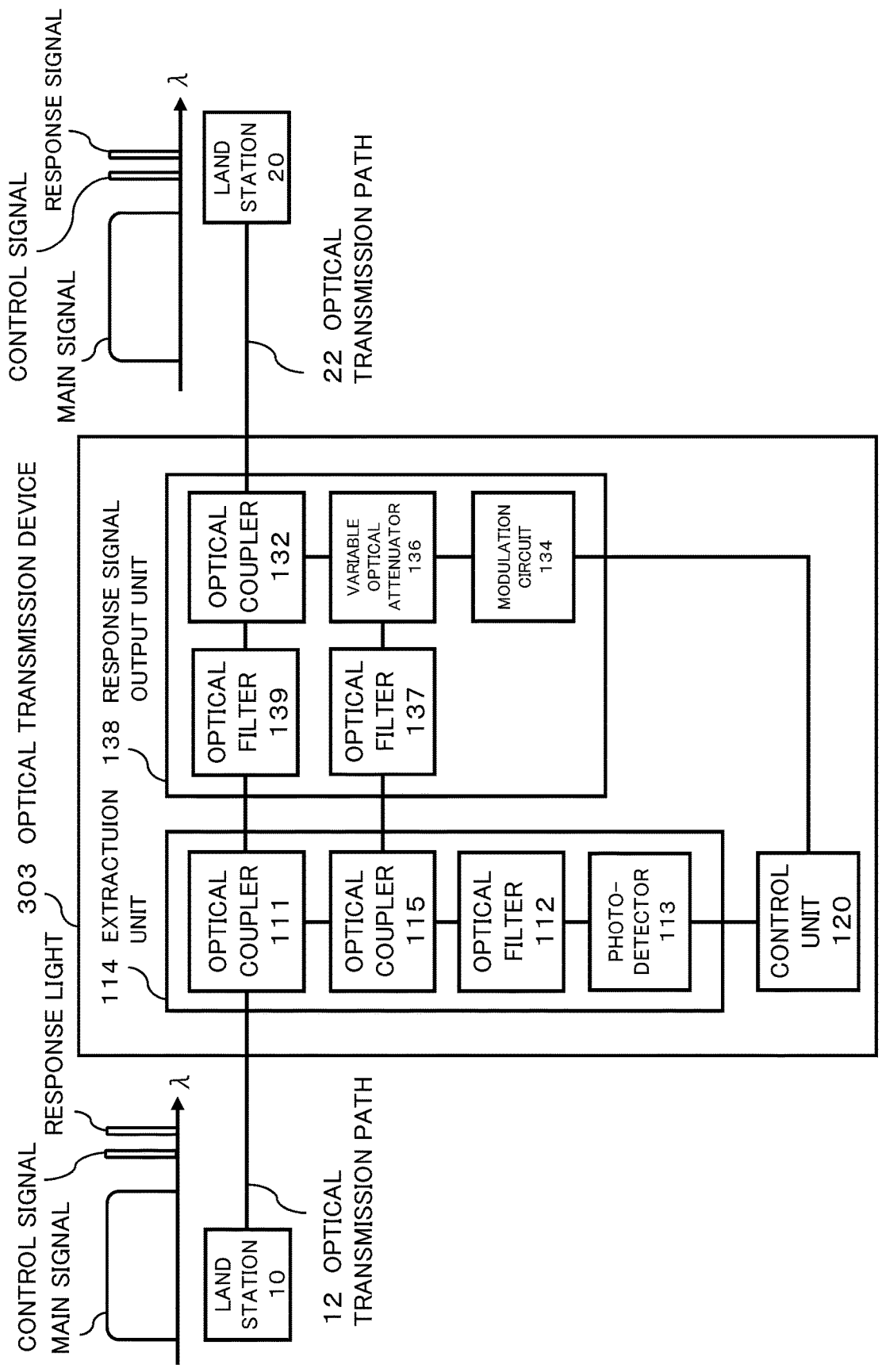
FIG. 20 is a block diagram illustrating a configuration example of an optical transmission device 303.

FIG. 20 is a block diagram illustrating a configuration example of an optical transmission device 303 in a modification example of the eighth example embodiment. As compared to the optical transmission device 302, the optical transmission device 303 includes a response signal output unit 138 in place of the response signal output unit 135. The response signal output unit 138 includes an optical filter 139. The optical filter 139 is arranged between the optical coupler 111 and the optical coupler 132, blocks light in a wavelength band of the response light, and allows light in the wavelength band of the main signal to pass therethrough. Specifically, the optical filter 139 blocks the response light contained in the light that is directly transmitted from the optical coupler 111 to the optical coupler 132. Therefore, the response light, which is input to the optical filter 139, and the response signal, which has a wavelength similar to that of the response light generated at the variable optical attenuator 136, can be prevented from being coupled at the optical coupler 132. As a result, in addition to the effect exerted by the optical transmission device 302, the optical transmission device 303 exerts an effect of improving an optical extinction ratio of the response signal.

Note that, in the extraction unit 110, a first optical demultiplexer may be used in place of the optical coupler 111. The first optical demultiplexer outputs only light in the wavelength band of the main signal to the response signal output unit 130 or 131, and outputs light in other wavelength bands to the optical filter 112. Further, in the extraction unit 114, the first optical demultiplexer may also be used in place of the optical coupler 111. The first optical demultiplexer applied to the extraction unit 114 outputs only light in the wavelength band of the main signal to the response signal output unit 138, and outputs light in other wavelength bands to the optical coupler 115. With these configurations, a splitting loss at the optical coupler 111 can be reduced. Further, in the optical transmission device 303, the optical filter 139 that blocks light in the wavelength band of the response light can be omitted.

Further, in the extraction unit 114, a second optical demultiplexer may be used in place of the optical coupler 115. The second optical demultiplexer outputs only light in the wavelength band of the response light to the response signal output unit 138, and outputs light in other wavelength bands to the optical filter 112. With this configuration, the optical filter 137, which only allows light in the wavelength band of the response light to pass therethrough, can be omitted.

The example embodiments described above may be described as in the following supplementary notes, but is not limited to the following.

(Supplementary Note 1)

An optical transmission device, including:
  an extraction unit that outputs a signal from a first optical signal including a main signal and a control signal, the signal including control information included in the control signal;
  a control unit that executes control, based on the control information; and
  a response signal output unit that outputs a response signal in a wavelength band different from a wavelength band of the main signal, according to the control.

(Supplementary Note 2)

The optical transmission device according to Supplementary Note 1, wherein the response signal is generated when the control is executed.

(Supplementary Note 3)

The optical transmission device according to Supplementary Note 1 or 2, wherein the response signal includes information on the control.

(Supplementary Note 4)

The optical transmission device according to any one of Supplementary Notes 1 to 3, wherein the control unit instructs the response signal output unit to generate the response signal every time the control is executed.

(Supplementary Note 5)

The optical transmission device according to any one of Supplementary Notes 1 to 4, wherein execution of the control is output of a control command indicating a content of the control with respect to a function block being a target for the control.

(Supplementary Note 6)

The optical transmission device according to Supplementary Note 5, wherein the control command is output by changing a voltage of a terminal of the control unit, the terminal being connected to the function block.

(Supplementary Note 7)

The optical transmission device according to Supplementary Note 5 or 6, wherein the control information includes information in which an address of the function block and the control command are associated with each other.

(Supplementary Note 8)

The optical transmission device according to Supplementary Note 7, wherein the control unit includes a storage unit for storing a table including the information in which the address and the control command are associated with each other.

(Supplementary Note 9)

The optical transmission device according to any one of Supplementary Notes 5 to 8, wherein the function block has a function of switching connection between three or more optical transmission paths connected to the optical transmission device.

(Supplementary Note 10)

The optical transmission device according to any one of Supplementary Notes 5 to 9, wherein the function block has a function of switching connection between three or more power supply paths connected to the optical transmission device.

(Supplementary Note 11)

The optical transmission device according to any one of Supplementary Notes 5 to 10, wherein the function block has a function of a reconfigurable optical add-drop multiplexer, or ROADM.

(Supplementary Note 12)

The optical transmission device according to any one of Supplementary Notes 5 to 11, wherein the function block includes an optical amplification function.

(Supplementary Note 13)

The optical transmission device according to any one of Supplementary Notes 1 to 12, wherein the control signal is an optical signal in a wavelength band different from a wavelength band of the main signal.

(Supplementary Note 14)

The optical transmission device according to any one of Supplementary Notes 1 to 12, wherein the control signal is a signal superposed on the main signal.

(Supplementary Note 15)

The optical transmission device according to any one of Supplementary Notes 1 to 14, wherein the response signal output unit includes a light source in a wavelength band of the response signal, and generates the response signal according to an instruction from the control unit.

(Supplementary Note 16)

The optical transmission device according to any one of Supplementary Notes 1 to 14, wherein
 the first optical signal includes a second optical signal being light in a wavelength band of the response signal,
 the extraction unit extracts the second optical signal from the first optical signal, and
 the response signal output unit modulates the second optical signal and generates the response signal, according to an instruction from the control unit.

(Supplementary Note 17)

The optical transmission device according to any one of Supplementary Notes 1 to 16, wherein the optical transmission device is installed on a seabed.

(Supplementary Note 18)

An optical transmission system including:
 a first land station that outputs a first optical signal including a main signal and a control signal;
 the optical transmission device according to any one of Supplementary Notes 1 to 17 that receives the first optical signal and outputs a response signal, based on control according to control information extracted from the first optical signal; and
 a second land station that receives the response signal.

(Supplementary Note 19)

The optical transmission system according to Supplementary Note 18, wherein the first land station and the second land station are an identical land station.

(Supplementary Note 20)

The optical transmission system according to Supplementary Note 18 or 19, wherein the first land station outputs a second optical signal to the optical transmission device, the second optical signal being light in a wavelength band of the response signal.

(Supplementary Note 21)

An optical transmission method including:
 outputting a signal from a first optical signal including a main signal and a control signal, the signal including control information included in the control signal;
 executing control, based on the control information; and
 outputting a response signal in a wavelength band different from a wavelength band of the main signal according to the control.

(Supplementary Note 22)

The optical transmission method according to Supplementary Note 21, wherein the response signal is generated when the control is executed.

(Supplementary Note 23)

The optical transmission method according to Supplementary Note 21 or 22, wherein the response signal includes information on the control.

(Supplementary Note 24)

The optical transmission method according to any one of Supplementary Notes 21 to 23, wherein generation of the response signal is instructed every time the control is executed.

(Supplementary Note 25)

The optical transmission method according to any one of Supplementary Notes 21 to 24, wherein execution of the control is output of a control command indicating a content of the control with respect to a function block being a target for the control.

(Supplementary Note 26)

The optical transmission method according to Supplementary Note 25, wherein the control command is output by changing a voltage of a terminal connected to the function block.

(Supplementary Note 27)

The optical transmission method according to Supplementary Note 25 or 26, wherein the control information includes information in which an address of the function block and the control command are associated with each other.

(Supplementary Note 28)

The optical transmission method according to Supplementary Note 27, further including storing a table including the information in which the address and the control command are associated with each other.

(Supplementary Note 29)

The optical transmission method according to any one of Supplementary Notes 25 to 28, wherein the function block has a function of switching connection between three or more optical transmission paths.

(Supplementary Note 30)

The optical transmission method according to any one of Supplementary Notes 25 to 29, wherein the function block has a function of switching connection between three or more power supply paths.

(Supplementary Note 31)

The optical transmission method according to any one of Supplementary Notes 25 to 30, wherein the function block has a function of reconfigurable optical add-drop multiplexer, or ROADM.

(Supplementary Note 32)

The optical transmission method according to any one of Supplementary Notes 25 to 31, wherein the function block has an optical amplification function.

(Supplementary Note 33)

The optical transmission method according to any one of Supplementary Notes 21 to 32, wherein the control signal is an optical signal in a wavelength band different from a wavelength band of the main signal.
(Supplementary Note 34)
The optical transmission method according to any one of Supplementary Notes 21 to 32, wherein the control signal is a signal superposed on the main signal.
(Supplementary Note 35)
The optical transmission method according to any one of Supplementary Notes 21 to 34, wherein a light source generates the response signal, according to an instruction from a control unit.
(Supplementary Note 36)
The optical transmission method according to any one of Supplementary Notes 21 to 35, wherein the first optical signal includes a second optical signal being light in a wavelength band of the response signal, and the method comprising:
 extracting the second optical signal from the first optical signal, and
 modulating the second optical signal, and generating the response signal.
(Supplementary Note 37)
A program for causing a computer of an optical transmission device to execute:
 a procedure of outputting a signal from a first optical signal including a main signal and a control signal, the signal including control information included in the control signal;
 a procedure of executing control, based on the control information; and
 a procedure of outputting a response signal in a wavelength band different from a wavelength band of the main signal, according to the control.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims. In each of the example embodiments, description is made on the optical transmission device applicable to the submarine optical transmission systems 1 and 2. However, the optical transmission device of each of the example embodiments may be applied to an optical transmission system on land.

The configurations described above in each of the example embodiments are not exclusive, and an optical transmission device or an optical transmission system of another mode may be achieved by appropriately combining the configurations. Further, a part or all of the functions of the optical transmission device described in each of the example embodiments may be achieved by causing the LSI 121 included in the control unit 120, a digital signal processor (DSP), or a central processing unit (CPU) to execute a program. The program is recorded in a fixed non-temporary recording medium. A semiconductor memory or a fixed magnetic disk device is used as the recording medium, but the recording medium is not limited thereto. The control unit 120 may include a storage medium.

This application is based upon and claims the benefit of priority from Japanese patent application No. 2018-242890, filed on Dec. 26, 2018, the disclosure of which is incorporated herein in its entirety by reference.

REFERENCE SIGNS LIST

1, 2 Optical transmission system
10 to 30 Land station
11, 21, 31 Submarine cable
12, 22, 32, 42 Optical transmission path
100 to 105, 301 to 303 Optical transmission device
110, 114 Extraction unit
111, 115, 132 Optical coupler
112, 137, 139 Optical filter
113 Photodetector
120 Control unit
130, 131, 135 Response signal output unit
133 Light source
134 Modulation circuit
136 Variable optical attenuator
201 Branching unit
202 Power supply switching unit
203 ROADM
204 Optical amplifier
211 Optical switch
212 Switching circuit

The invention claimed is:

1. An optical transmission device comprising:
 an extraction circuit configured to output a signal from a first optical signal including a main signal and a control signal, the signal including control information included in the control signal;
 a control circuit configured to execute control, based on the control information; and
 a response signal output circuit configured to generate a response signal in a wavelength band different from a wavelength band of the main signal and output an optical signal including the main signal and the response signal, according to the control,
 wherein the first optical signal includes a second optical signal being light in the wavelength band of the response signal,
 wherein the extraction circuit extracts the second optical signal from the first optical signal,
 wherein the response signal output circuit modulates the second optical signal extracted and generates the response signal, according to an instruction from the control circuit, and
 wherein the control signal is a signal superposed on the main signal.

2. The optical transmission device according to claim 1, wherein the response signal is generated when the control is executed.

3. The optical transmission device according to claim 1, wherein the response signal includes information on the control.

4. The optical transmission device according to claim 1, wherein the control circuit instructs the response signal output circuit to generate the response signal every time the control is executed.

5. The optical transmission device according to claim 1, wherein execution of the control is output of a control command indicating a content of the control with respect to a function block being a target for the control.

6. The optical transmission device according to claim 5, wherein the control command is output by changing a voltage of a terminal of the control circuit, the terminal being connected to the function block.

7. The optical transmission device according to claim 5, wherein the function block has a function of switching connection between three or more optical transmission paths connected to the optical transmission device.

8. The optical transmission device according to claim 5, wherein the function block has a function of switching connection between three or more power supply paths connected to the optical transmission device.

9. The optical transmission device according to claim 5, wherein the function block has a function of a reconfigurable optical add-drop multiplexer ROADM.

10. The optical transmission device according to claim 5, wherein the function block includes an optical amplification function.

11. The optical transmission device according to claim 1, wherein the control signal is an optical signal in a wavelength band different from a wavelength band of the main signal.

12. The optical transmission device according to claim 1, wherein the optical transmission device is installed on a seabed.

13. An optical transmission device comprising:
   an extraction circuit configured to output a signal from a first optical signal including a main signal and a control signal, the signal including control information included in the control signal;
   a control circuit configured to execute control, based on the control information; and
   a response signal output circuit configured to generate a response signal in a wavelength band different from a wavelength band of the main signal and output an optical signal including the main signal and the response signal, according to the control,
   wherein the first optical signal includes a second optical signal being light in the wavelength band of the response signal,
   wherein the extraction circuit extracts the second optical signal from the first optical signal,
   wherein the response signal output circuit modulates the second optical signal extracted and generates the response signal, according to an instruction from the control circuit,
   wherein execution of the control is output of a control command indicating a content of the control with respect to a function block being a target for the control, and
   wherein the control information includes information in which an address of the function block and the control command are associated with each other.

14. The optical transmission device according to claim 13, wherein the control circuit includes a storage circuit configured to store a table including the information in which the address and the control command are associated with each other.

15. An optical transmission method comprising:
   outputting a signal from a first optical signal including a main signal and a control signal, the signal including control information included in the control signal;
   executing control, based on the control information; and
   generating a response signal in a wavelength band different from a wavelength band of the main signal and outputting an optical signal including the main signal and the response signal, according to the control,
   wherein the first optical signal includes a second optical signal being light in the wavelength band of the response signal,
   wherein the optical transmission method further comprises extracting the second optical signal from the first optical signal,
   wherein the optical transmission method further comprises modulating the second optical signal extracted and generating the response signal, according to an instruction from a control circuit, and
   wherein the control signal is a signal superposed on the main signal.

\* \* \* \* \*